(12) United States Patent  
Attar et al.

(10) Patent No.: US 8,514,832 B2  
(45) Date of Patent: Aug. 20, 2013

(54) METHODS AND APPARATUS ENABLING INCREASED THROUGHPUT ON THE REVERSE LINK

(75) Inventors: Rashid Ahmed Akbar Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 12/540,236

(22) Filed: Aug. 12, 2009

(65) Prior Publication Data

US 2010/0014487 A1 Jan. 21, 2010

Related U.S. Application Data

(63) Continuation of application No. 10/389,656, filed on Mar. 13, 2003, now Pat. No. 7,746,816.

(51) Int. Cl.  
*H04J 3/00* (2006.01)

(52) U.S. Cl.  
USPC ........... 370/345; 370/347; 370/337; 370/326; 370/321; 370/310

(58) Field of Classification Search  
USPC ................. 370/318–321, 337, 347, 345, 336, 370/330, 326, 310  
See application file for complete search history.

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,103,459 A | 4/1992 | Gilhousen et al. | |
| 5,267,261 A | 11/1993 | Blakeney et al. | |
| 5,504,773 A | 4/1996 | Padovani et al. | |
| 5,933,462 A | 8/1999 | Viterbi et al. | |
| 5,933,787 A | 8/1999 | Gilhousen et al. | |
| 6,192,249 B1 | 2/2001 | Padovani | |
| 6,205,129 B1 | 3/2001 | Esteves et al. | |
| 6,229,795 B1 | 5/2001 | Pankaj et al. | |
| 6,233,271 B1 | 5/2001 | Jones et al. | |
| 6,574,211 B2 | 6/2003 | Padovani et al. | |
| 6,587,696 B1 | 7/2003 | Ma et al. | |

(Continued)

FOREIGN PATENT DOCUMENTS

| | | |
|---|---|---|
| CN | 1377535 A | 10/2002 |
| EP | 0568291 A2 | 11/1993 |

(Continued)

OTHER PUBLICATIONS

3GPP TS 25211 V530: 3rd Generation Partnership Project; Technical Specification Group Radio Access Network; Physical Channels and Mapping of Transport Channels onto Physical Channels (FDD) (Release 5), pp. 1-51 (Dec. 2002).

(Continued)

*Primary Examiner* — Patrick Edouard  
*Assistant Examiner* — Julio Perez  
(74) *Attorney, Agent, or Firm* — Charles E. Eggers

(57) ABSTRACT

A method for transmitting user data from access terminals, including receiving at each of a first subset of the access terminals a scheduling decision for an interval; selecting at each access terminal of the first subset a mode for data multiplexing, wherein at least three modes are available; and transmitting the user data using the selected mode of data multiplexing in accordance with the scheduling decision.

38 Claims, 13 Drawing Sheets

(56) References Cited

U.S. PATENT DOCUMENTS

| | | |
|---|---|---|
| 6,678,257 B1 | 1/2004 | Vijayan et al. |
| 6,694,469 B1 | 2/2004 | Jalali et al. |
| 6,782,271 B2 | 8/2004 | Huh et al. |
| 6,842,624 B2 | 1/2005 | Sarkar et al. |
| 6,879,813 B2 | 4/2005 | Reznik |
| 6,983,164 B2 | 1/2006 | Kajimura |
| 6,987,778 B2 | 1/2006 | Sindhushayana et al. |
| 7,031,741 B2 | 4/2006 | Lee et al. |
| 7,050,405 B2 | 5/2006 | Attar et al. |
| 7,110,785 B1 | 9/2006 | Paranchych et al. |
| 7,120,134 B2 | 10/2006 | Tiedemann et al. |
| 7,139,274 B2 | 11/2006 | Attar et al. |
| 7,194,006 B2 | 3/2007 | Wong et al. |
| 7,330,446 B2 | 2/2008 | Lee et al. |
| 7,379,434 B2 | 5/2008 | Moulsley et al. |
| 7,463,600 B2 | 12/2008 | Tong et al. |
| 7,746,816 B2 | 6/2010 | Attar et al. |
| 2002/0191570 A1 | 12/2002 | Kim et al. |
| 2003/0021245 A1* | 1/2003 | Haumonte et al. ............ 370/330 |
| 2003/0045319 A1 | 3/2003 | Sarkar et al. |
| 2003/0048753 A1 | 3/2003 | Jalali |
| 2003/0131303 A1 | 7/2003 | Kim et al. |
| 2004/0037291 A1 | 2/2004 | Attar et al. |
| 2004/0038697 A1 | 2/2004 | Attar et al. |
| 2004/0085940 A1 | 5/2004 | Black et al. |
| 2004/0114563 A1* | 6/2004 | Shvodian ...................... 370/347 |
| 2004/0160942 A1* | 8/2004 | Kelley et al. .................. 370/350 |
| 2004/0179469 A1 | 9/2004 | Attar et al. |
| 2004/0179480 A1 | 9/2004 | Attar et al. |
| 2004/0181569 A1 | 9/2004 | Attar et al. |
| 2004/0198404 A1 | 10/2004 | Attar et al. |

FOREIGN PATENT DOCUMENTS

| | | |
|---|---|---|
| JP | 2001069077 A | 3/2001 |
| JP | 2004513536 A | 4/2004 |
| JP | 2004533156 A | 10/2004 |
| JP | 2005509314 | 4/2005 |
| RU | 2156545 | 9/2000 |
| WO | WO 97009794 | 3/1997 |
| WO | WO 0025485 A1 | 5/2000 |
| WO | WO 0124402 A1 | 4/2001 |
| WO | WO0199312 | 12/2001 |
| WO | WO0201762 | 1/2002 |
| WO | WO 0241522 A2 | 5/2002 |
| WO | WO 02065664 A2 | 8/2002 |
| WO | WO 02080402 | 10/2002 |
| WO | WO 02080403 | 10/2002 |

OTHER PUBLICATIONS

3GPP TS 25212 V540: 3rd Generation Partnership Project; Technical Specification Group Radio Access Network; Multiplexing and Channel Coding (FDD) (Release 5), pp. 1-74 (Mar. 2003).

3GPP TS 25214 V3120: 3rd Generation Partnership Project; Technical Specification Group Radio Access Network; Spreading and Modulation (FDD) (Release 5), pp. 1-28 (Mar. 2003).

3GPP TS 25214 V3120: 3rd Generation Partnership Project; Technical Specification Group Radio Access Network; Physical Layer Procedures (FDD) (Release 1999), pp. 1-52 (Mar. 2003).

3GPP2 CS000 2-C, Version 1.0: 3rd Generation Partnership Project 2, Physical Layer Standard for cdma2000 Spread Spectrum Systems Release C, pp. 1-509 (May 28, 2002).

3GPP2 CS0024, Version 2.0: cdma2000 High Rate Packet Data Air interface Specification, pp. 1-441 (Oct. 27, 2000).

Dahlman et al, "Wide-Band Services in a DC-SDMA based FPLMTS System," Vehicular Technology Conference, Mobile Technology for the Human Race, Atlanta, Georgia, 1996, 1656-1660.

Ojanpera et al., "Frames-Hybrid Multiple Access Technology," IEEE International Symposium on Spread Spectrum Techniques and Applications, 1996, 1, 320-324.

TIA/EIA/IS-707-A8 (PN-41458): Data Service Options for Spread Spectrum Systems: Radio Link Protocol Type 2, pp. 1-47 (Mar. 1999).

TIA/EIA/IS-95: Mobile Station-Base Station Compatibility Standard for Dual-Mode Wideband Spread Spectrum Cellular System, pp. 1-668 (Jul. 1993).

Viterbi et al., "Soft Handoff Extends CDMA Coverage And Increases Reverse Link Capacity," IEEE Journal on Selected Areas in Communications, 1994, 12 (8), 1281-1288.

International Search Report and Written Opinion, PCT/US2004/007712 International Search Authority—European Patent Office, Dec. 23, 2004.

* cited by examiner

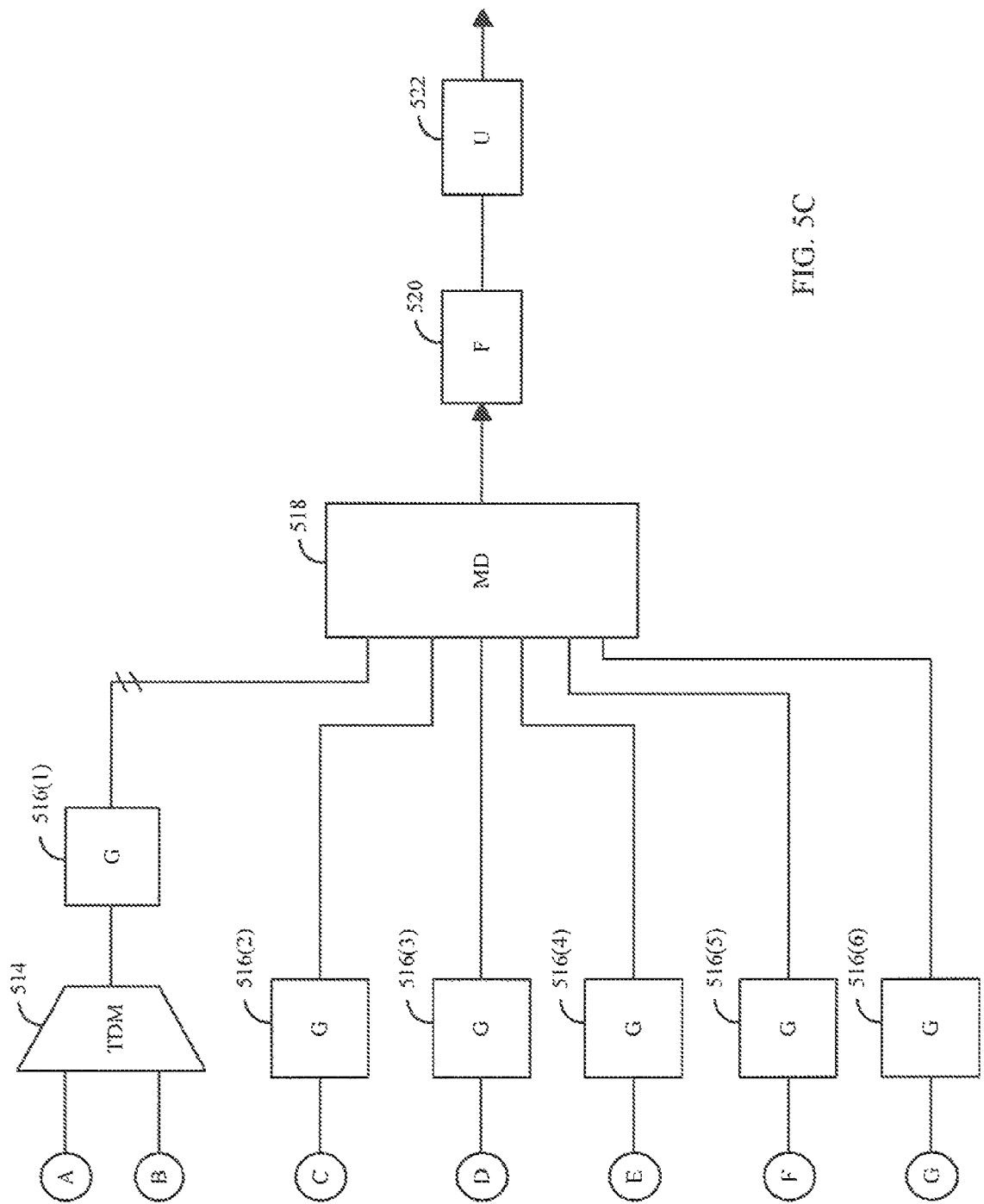

METHODS AND APPARATUS ENABLING INCREASED THROUGHPUT ON THE REVERSE LINK

CLAIM OF PRIORITY UNDER 35 U.S.C. §120

The present application for patent is a Continuation of, and claims priority to, patent application Ser. No. 10/389,656, entitled "Method and System for a Power Control in a Communication System," filed Mar. 13, 2003, now allowed, and assigned to the assignee hereof and hereby expressly incorporated by reference herein.

BACKGROUND

1. Field

The present invention relates to communications in a wireline or a wireless communication system. More particularly, the present invention relates to a method and system for a data transmission in such a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Modulation also facilitates multiple-access, i.e., simultaneous transmission and/or reception, of several signals over a common communication channel. Several multiple-access techniques are known in the art, such as time division multiple-access (TDMA), and frequency division multiple-access (FDMA). Another type of a multiple-access technique is a code-division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the present assignee.

A multiple-access communication system may be wireless or wire-line and may carry voice traffic and/or data traffic. An example of a communication system carrying both voice and data traffic is a system in accordance with the IS-95 standard, which specifies transmitting voice and data traffic over a communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the present assignee. In accordance with the IS-95 standard, the data traffic or voice traffic is partitioned into code channel frames that are 20 milliseconds wide with data rates as high as 14.4 Kbps. Additional examples of communication systems carrying both voice and data traffic comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

The term base station is an access network entity, with which subscriber stations communicate. With reference to the IS-856 standard, the base station is also referred to as an access point. Cell refers to the base station or a geographic coverage area served by a base station, depending on the context in which the term is used. A sector is a partition of a base station, serving a partition of a geographic area served by the base station.

The term "subscriber station" is used herein to mean the entity with which an access network communicates. With reference to the IS-856 standard, the base station is also referred to as an access terminal. A subscriber station may be mobile or stationary. A subscriber station may be any data device that communicates through a wireless channel or through a wired channel, for example fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term access network is a collection of at least one base station (BS) and one or more base stations' controllers. The access network transports information signals between multiple subscriber stations. The access network may be further connected to additional networks outside the access network, such as a corporate intranet or the Internet, and may transport information signals between each base station and such outside networks.

In the above-described multiple-access wireless communication system, communications between users are conducted through one or more base stations. The term user refers to both animate and inanimate entities. A first user on one wireless subscriber station communicates to a second user on a second wireless subscriber station by conveying information signal on a reverse link to a base station. The base station receives the information signal and conveys the information signal on a forward link to the second subscriber station. If the second subscriber station is not in the area served by the base station, the base station routes the data to another base station, in whose service area the second subscriber station is located. The second base station then conveys the information signal on a forward link to the second subscriber station. The forward link refers to transmissions from a base station to a wireless subscriber station and the reverse link refers to transmissions from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station. In many communication systems, e.g., IS-95, W-CDMA, and IS-2000, the forward link and the reverse link are allocated separate frequencies.

Study of voice traffic only services and data traffic only services revealed some substantial differences between the two types of services. One difference concerns delay in delivery of the information content. The voice traffic services impose stringent and fixed delay requirements. Typically, an overall one-way delay of a predetermined amount of voice traffic information, referred to as a speech frame, must be less than 100 ms. In contrast, the overall one-way data traffic delay may be a variable parameter, used to optimize the efficiency of the data traffic services provided by the communication system. For example, multi-user diversity, delay of data transmission until more favorable conditions, more efficient error correcting coding techniques, which require significantly larger delays than delays that can be tolerated by voice traffic services, and other techniques can be utilized. An exemplary efficient coding scheme for data is disclosed in U.S. Pat. No. 5,933,462, issued Aug. 3, 1999 to Sindhushayana et., entitled "SOFT DECISION OUTPUT DECODER FOR DECODING CONVOLUTIONALLY ENCODED CODEWORDS", filed Nov. 6, 1996, assigned to the present assignee.

Another significant difference between voice traffic services and data traffic services is that the former require a fixed and common grade of service (GOS) for all users. Typically, for digital communication systems providing voice traffic services, this requirement translates into a fixed and equal transmission rate for all users and a maximum tolerable value for the error rates of speech frames. In contrast, the GOS for data services may be different from user to user, and may be a variable parameter, whose optimization increases the overall efficiency of the data traffic service providing communication system. The GOS of a data traffic service providing communication system is typically defined as the total delay incurred in the transfer of a predetermined amount of data traffic information may comprise, e.g., a data packet. The term packet is a group of bits, including data (payload) and control elements, arranged into a specific format. The control elements comprise, e.g., a preamble, a quality metric, and others known to one skilled in the art. Quality metric comprises, e.g., a cyclic redundancy check (CRC), a parity bit, and others known to one skilled in the art.

Yet, another significant difference between voice traffic services and data traffic services is that the former requires a reliable communication link. When a subscriber station, communicating voice traffic with a first base station, moves to the edge of the cell served by the first base station, the subscriber station enters a region of overlap with another cell served by a second base station. The subscriber station in such a region establishes a voice traffic communication with the second base station while maintaining a voice traffic communication with the first base station. During such a simultaneous communication, the subscriber station receives a signal carrying identical information from two base stations. Likewise, both of the base stations also receive signals carrying information from the subscriber station.

Such a simultaneous communication is termed soft handoff. When the subscriber station eventually leaves the cell served by the first base station, and breaks the voice traffic communication with the first base station, the subscriber station continues the voice traffic communication with the second base station. Because soft hand-off is a "make before break" mechanism, the soft-handoff minimizes the probability of dropped calls. A method and system for providing a communication with a subscriber station through more than one base station during the soft hand-off process are disclosed in U.S. Pat. No. 5,267,261, entitled "MOBILE ASSISTED SOFT HAND-OFF IN A CDMA CELLULAR TELEPHONE SYSTEM," assigned to the present assignee.

Softer hand-off is a similar process whereby the communication occurs over at least two sectors of a multi-sector base station. The process of softer hand-off is described in detail in U.S. Pat. No. 5,933,787, issued Aug. 3, 1999 to Gilhousen et al., entitled "METHOD AND APPARATUS FOR PERFORMING HAND-OFF BETWEEN SECTORS OF A COMMON BASE STATION", filed Dec. 11, 1996, assigned to the present assignee. Thus, both soft and softer hand-off for voice services result in redundant transmissions from two or more base stations to improve reliability.

This additional reliability is not so important for data traffic communications because the data packets received in error can be retransmitted. Important parameters for data services are transmission delay required to transfer a data packet and the average throughput of the data traffic communication system. The transmission delay does not have the same impact in data communication as in voice communication, but the transmission delay is an important metric for measuring the quality of the data communication system. The average throughput rate is a measure of the efficiency of the data transmission capability of the communication system. Because of relaxed transmission delay requirement, the transmit power and resources used to support soft hand-off on the forward link can be used for transmission of additional data, thus, increasing average throughput rate by increasing efficiency.

The situation is different on the reverse link. Several base stations can receive the signal transmitted by a subscriber station. Because re-transmission of packets from a subscriber station requires additional power from a power limited source (a battery), it may be efficient to support soft hand-off on the reverse link by allocating resources at several base stations to receive and process the data packets transmitted from the subscriber station. Such a utilization of soft-handoff increases both coverage and reverse link capacity as discussed in a paper by Andrew J. Viterbi and Klein S. Gilhousen: "Soft Handoff Extends CDMA coverage and Increases Reverse Link Capacity," IEEE Journal on Selected Areas in Communications, Vol. 12, No. 8, Oct. 1994. The term soft hand-off is a communication between a subscriber station and two or more sectors, wherein each sector belongs to a different cell. In the context of the IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the access terminal. Additionally, softer handoff may be used for this purpose. The term softer hand-off is a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the access terminal.

It is well known that quality and effectiveness of data transfer in a wireless communication system is dependent on the condition of a communication channel between a source terminal and a destination terminal. Such a condition, expressed as, for example, a signal-to-interference-and-noise-ratio (SINR), is affected by several factors, e.g., a path loss and the path loss' variation of a subscriber station within a coverage area of a base station, interference from other subscriber stations both from the same-cell and from other-cell, interference from other base stations, and other factors know to one of ordinary skill in the art. In order to maintain a certain level of service under variable conditions of the communication channel, TDMA and FDMA systems resort to separating users by different frequencies and/or time-slots and support frequency reuse to mitigate the interference. Frequency reuse divides an available spectrum into many sets of frequencies. A given cell uses frequencies from only one set; the cells immediately adjacent to this cell may not use a frequency from the same set. In a CDMA system, the identical frequency is reused in every cell of the communication system, thereby improving the overall efficiency. The interference is mitigated by other techniques, e.g., orthogonal coding, transmission power control, variable rate data, and other techniques known to one of ordinary skill in the art.

The above-mentioned concepts were utilized in a development of a data traffic only communication system known as the High Data Rate (HDR) communication system. Such a communication system is disclosed in detail in U.S. Pat. No. 6,574,211, issued Jun. 3, 2003, to Padovani et al., entitled "METHOD AND APPARATUS FOR HIGH RATE PACKET DATA TRANSMISSION," filed Nov. 3, 1997, assigned to the present assignee. The HDR communication system was standardized as a TIA/EIA/IS-856 industry standard hereinafter referred to as the IS-856 standard.

The IS-856 standard defines a set of data rates, ranging from 38.4 kbps to 2.4 Mbps, at which an access point (AP) may send data to a subscriber station (access terminal). Because the access point is analogous to a base station, the terminology with respect to cells and sectors is the same as with respect to voice systems. In accordance with the IS-856 standard, the data to be transmitted over the forward link are partitioned into data packets, with each data packet being transmitted over one or more intervals (time-slots), into which the forward link is divided. At each time-slot, data transmission occurs from an access point to one and only one access terminal, located within the coverage area of the access point, at the maximum data rate that can be supported by the forward link and the communication system. The access terminal is selected in accordance with forward link conditions between the access point and an access terminal. The forward link conditions depend on interference and path loss between an access point and an access terminal, both of which are time-variant. The path loss and the variation of the path loss are exploited by scheduling the access point's transmissions at time intervals, during which the access terminal's forward link conditions to a particular access point satisfy determined criteria that allow for transmissions with less power or higher rate of data than transmissions to the remaining access terminals, thus improving spectral efficiency of forward link transmissions.

In contrast, according to the IS-856 standard, data transmissions on the reverse link occur from multiple access terminals located within a coverage area of an access point. Furthermore, because the access terminals' antenna patterns are omni-directional, any access terminal within the coverage area of the access point may receive these data transmissions. Consequently, the reverse link transmissions are subjected to several sources of interference: code-division multiplexed overhead channels of other access terminals, data transmissions from access terminals located in the coverage area of the access point (same-cell access terminals), and data transmissions from access terminals located in the coverage area of other access points (other-cell access terminals). Multiplex or multiplexing in general means communicating multiple data streams over one communication channel.

With the development of wireless data services, the emphasis has been on increasing data throughput on the forward link, following the model of Internet services; where a server provides a high rate data in response to requests from a host. The server-to-host direction is akin to a forward link requiring a high throughput, while the host-to-server requests and/or data transfers are at lower throughput. However, present developments indicate a growth of reverse link data intense applications, e.g., file transfer protocol (FTP), video conferencing, gaming and other constant rate of data services. Such applications require improved efficiency of the reverse link to achieve higher data rates, so that applications demanding high throughput over reverse link. Therefore, there is a need in the art to increase data throughput on the reverse link, ideally to provide symmetric forward and reverse links throughputs.

Embodiments of an inventive reverse link transmission method and apparatus are disclosed in a co-pending application Ser. Nos. 10/313,553 and 10/313,594, entitled "METHOD AND APPARATUS FOR A DATA TRANSMISSION OVER A REVERSE LINK IN A COMMUNICATION SYSTEM," filed Dec. 6, 2002, assigned to the assignee of the present invention. The inventive reverse link transmission method and apparatus may not be fully applicable to already built (legacy) communication systems due to link-budget considerations, as explained in detail below. Consequently, introduction of the inventive reverse link transmission method and apparatus of the application Ser. Nos. 10/313,553 and 10/313,594, to legacy communication systems presents issues related to above-mentioned link-budget considerations, and coexistence of subscriber stations capable of receiving the inventive reverse link (new subscriber stations) and subscriber stations capable of receiving only the IS-856 reverse link (legacy subscriber stations). Additionally, the inventive reverse link transmission method and apparatus further create need in the art for method and apparatus for a power control and a rate of data determination.

Therefore, there is a need in the art to for an apparatus and method enabling increased data throughput on the reverse link taking into consideration the above-described issues.

SUMMARY OF INVENTION

In one aspect of the invention, the above stated needs for a power control of a channel are addressed by determining a transmit power of a first channel; determining a quality of service (QoS) to be provided on the channel; determining a transmit power ratio of the channel to the first channel for a data rate to be transmitted on the channel in accordance with the QoS; adjusting the transmit power ratio in accordance with a quality metric of the channel; and computing the channel transmit power in accordance with the adjusted transmit power ratio.

In another aspect of the invention, the above stated needs for a set point determination are addressed by determining the quality metric of the second channel; detecting presence of user data in the third channel; decoding user data if presence of user data in the third channel was detected; and determining the set point in accordance with the quality metric and a result of the detecting.

BRIEF DESCRIPTION OF THE DRAWINGS

FIGS. 5a-5c illustrate an embodiment of a reverse link channels' architecture;

DETAILED DESCRIPTION

Figure 1:
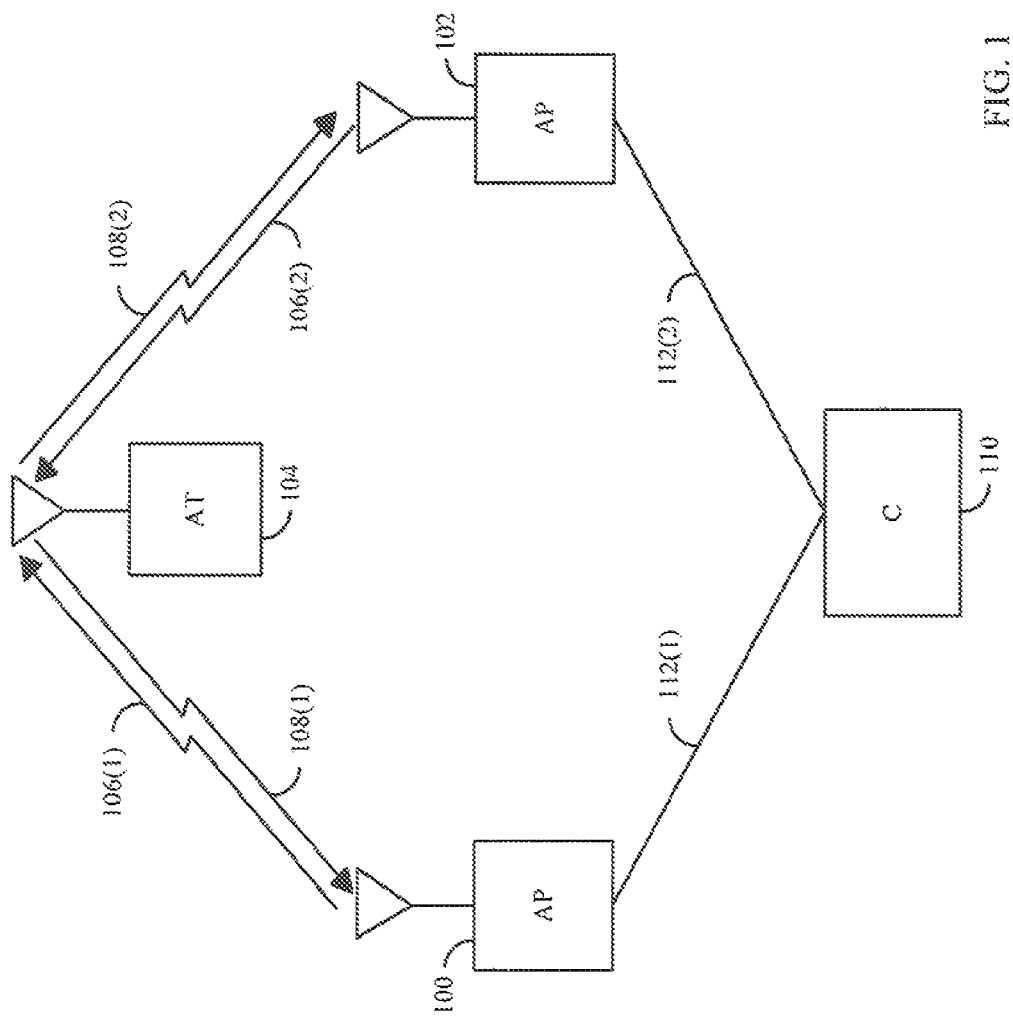
FIG. 1 illustrates conceptual block diagram of a communication system capable of operation in accordance with embodiments of the present invention.

FIG. 1 illustrates a conceptual diagram of a communication system. Such a communication system can be built in accordance with the IS-856 standard. An access point 100 transmits data to an access terminal 104 over a forward link 106(1), and receives data from the access terminal 104 over a reverse link 108(1). Similarly, an access point 102 transmits data to the access terminal 104 over a forward link 106(2), and receives data from the access terminal 104 over a reverse link 108(2). Data transmission on the forward link occurs from one access point to one access terminal at or near the maximum data rate that can be supported by the forward link and the communication system. Additional channels of the forward link, e.g., control channel, may be transmitted from multiple access points to one access terminal. Reverse link data communication may occur from one access terminal to one or more access points. The access point 100 and the access point 102 are connected to an access network controller 110 over backhauls 112(1) and 112(2). A "backhaul" is a communication link between a controller and an access point. Although only one access terminal and two access points are shown in FIG. 1, this is for the sake of explanation only, and the communication system can comprise a plurality of access terminal's and access point's.

After registration, which allows an access terminal to access an access network, the access terminal 104 and one of the access point's, e.g., the access point 100, establish a communication link using a predetermined access procedure. In the connected state, resulting from the predetermined access procedure, the access terminal 104 is able to receive data and control messages from the access point 100, and is able to transmit data and control messages to the access point 100. The access terminal 104 continually searches for other access points that could be added to the access terminal's 104 active set. An active set comprises a list of access points capable of communication with the access terminal 104. When such an access point is found, the access terminal 104 calculates a quality metric of the access point's forward link, which may comprise a signal-to-interference-and-noise ratio (SINR). An SINR may be determined in accordance with a pilot signal. The access terminal 104 searches for other access points and determines access points' SINR. Simultaneously, the access terminal 104 calculates a quality metric of a forward link for each access point in the access terminal's 104 active set. If the forward link quality metric from a particular access point is above a predetermined add threshold or below a predetermined drop threshold for a predetermined period of time, the access terminal 104 reports this information to the access point 100. Subsequent messages from the access point 100 may direct the access terminal 104 to add to or to delete from the access terminal 104 active set the particular access point.

The access terminal 104 selects a serving access point from the access terminal's 104 active set based on a set of parameters. A serving access point is an access point that is selected for data communication a particular access terminal or an access point that is communicating data to the particular access terminal. The set of parameters may comprise any one or more of present and previous SINR measurements, a bit-error-rate, a packet-error-rate, for example, and any other known parameters. Thus, for example, the serving access point may be selected in accordance with the largest SINR measurement. The access terminal 104 then broadcasts a data request message (DRC message) on a data request channel (DRC channel). The DRC message can contain a requested data rate or, alternatively, an indication of a quality of the forward link, e.g., measured SINR, a bit-error-rate, a packet-error-rate and the like. The access terminal 104 may direct the broadcast of the DRC message to a specific access point by the use of a code, which uniquely identifies the specific access point. Typically, the code comprises a Walsh code. The DRC message symbols are exclusively OR'ed (XOR) with the unique code. This XOR operation is referred to as code covering of a signal. Since each access point in the active set of the access terminal 104 is identified by a unique Walsh code, only the selected access point which performs the identical XOR operation as that performed by the access terminal 104 with the correct Walsh code can correctly decode the DRC message.

The data to be transmitted to the access terminal 104 arrive at the access network controller 110. Thereafter, the access network controller 110 may send the data to all access points in the access terminal 104 active set over the backhaul 112. Alternatively, the access network controller 110 may first determine, which access point was selected by the access terminal 104 as the serving access point, and then send the data to the serving access point. The data are stored in a queue at the access point(s). A paging message is then sent by one or more access points to the access terminal 104 on respective control channels. The access terminal 104 demodulates and decodes the signals on one or more control channels to obtain the paging messages.

At each forward link interval, the access point may schedule data transmissions to any of the access terminals that received the paging message. An exemplary method for scheduling transmission is described in U.S. Pat. No. 6,229, 795, entitled "System for allocating resources in a communication system," assigned to the present assignee. The access point uses the rate control information received in the DRC message from each access terminal to efficiently transmit forward link data at the highest possible rate. Because the rate of data may vary, the communication system operates in a variable rate mode. The access point determines the data rate at which to transmit the data to the access terminal 104 based on the most recent value of the DRC message received from the access terminal 104. Additionally, the access point uniquely identifies a transmission to the access terminal 104 by using a spreading code, which is unique to that mobile station. This spreading code is a long pseudo noise (PN) code, for example a spreading code defined by the IS-856 standard.

The access terminal 104, for which the data packet is intended, receives and decodes the data packet. Each data packet is associated with an identifier, e.g. a sequence number, which is used by the access terminal 104 to detect either missed or duplicate transmissions. In such an event, the access terminal 104 communicates the sequence numbers of the missing data packets via the reverse link data channel. The access network controller 110, which receives the data messages from the access terminal 104 via the access point communicating with the access terminal 104, then indicates to the access point what data units were not received by the access terminal 104. The access point then schedules a re-transmission of such data packets.

When the communication link between the access terminal 104 and the access point 100, operating in the variable rate mode, deteriorates below a predetermined reliability level, the access terminal 104 first attempts to determine whether another access point in the variable rate mode can support an acceptable rate of data. If the access terminal 104 ascertains such an access point (e.g., the access point 102), a re-pointing to the access point 102 to a different communication link occurs. The term re-pointing is a selection of a sector that is a member of an access terminals' active list, wherein the sector is different than a currently selected sector. The data transmissions continue from the access point 102 in the variable rate mode.

The above-mentioned deterioration of the communication link can be caused by, e.g., the access terminal 104 moving from a coverage area of the access point 100 to the coverage area of the access point 102, shadowing, fading, and other well known reasons. Alternatively, when a communication link between the access terminal 104 and another access point (e.g., the access point 102) that may achieve a higher throughput rate than the currently used communication link becomes available, a re-pointing to the access point 102 to a different communication link occurs, and the data transmissions continue from the access point 102 in the variable rate mode. If the access terminal 104 fails to detect an access point that can operate in the variable rate mode and support an acceptable data rate, the access terminal 104 transitions into a fixed rate mode. In such a mode, access terminal transmits at one rate.

The access terminal 104 evaluates the communication links with all candidate access points for both variable rate data and fixed rate data modes, and selects the access point, which yields the highest throughput.

The access terminal 104 will switch from the fixed rate mode back to the variable rate mode if the sector is no longer a member of the access terminal 104 active set.

The above-described fixed rate mode and associated methods for transition to and from the fixed rate data mode are similar to those disclosed in detail in U.S. Application No. 6,205,129, entitled "METHOD AND APPARATUS FOR VARIABLE AND FIXED FORWARD LINK RATE CONTROL IN A MOBILE RADIO COMMUNICATION SYSTEM", assigned to the present assignee. Other fixed rate modes and associated methods for transition to and from the fixed mode can also be contemplated and are within the scope of the present invention.

Forward Link Structure

Figure 2:
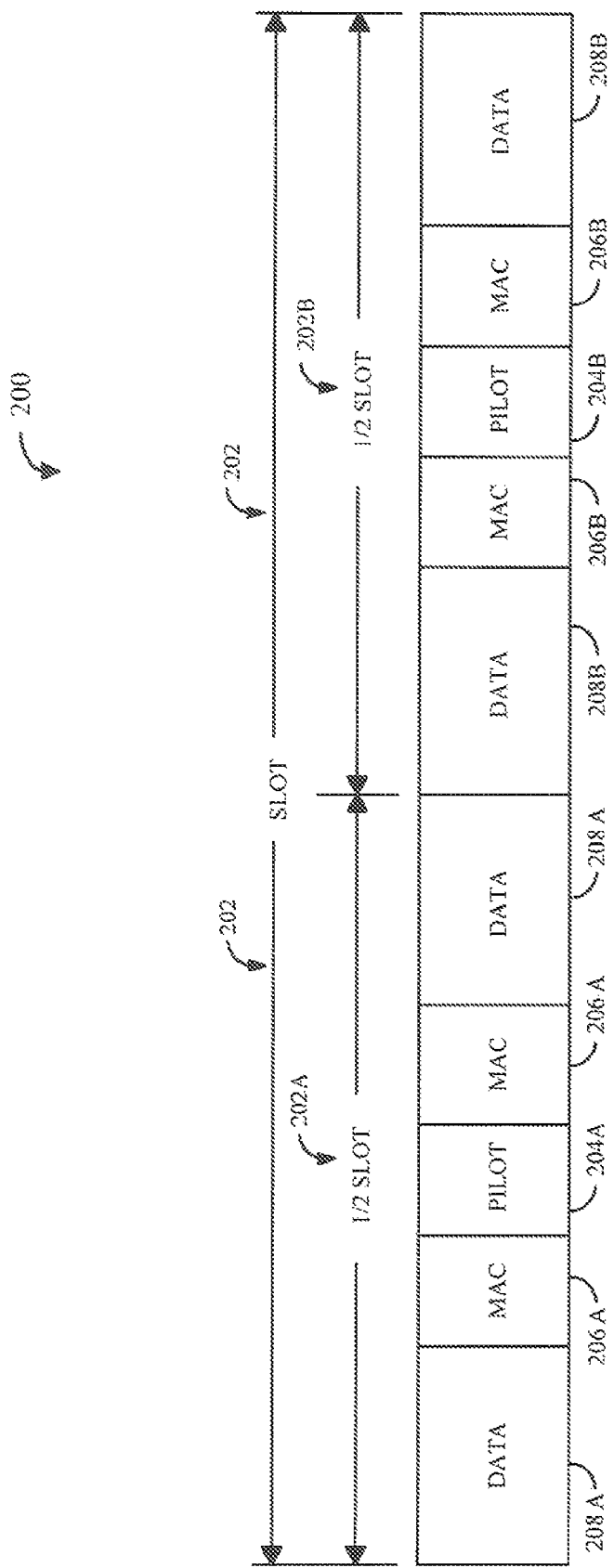
FIG. 2 illustrates an embodiment of a forward link waveform of the present invention.

FIG. 2 illustrates a forward link structure 200. It will be appreciated that the below described time durations, chip lengths, value ranges are given in a way of example only, and other time durations, chip lengths, value ranges may be used without departing from the underlying principles of operation of the communication system. The term "chip" is a unit of a code spreading signal having two possible values.

The forward link 200 is defined in terms of frames. A frame is a structure comprising 16 time-slots 202, each time-slot 202 being 2048 chips long, corresponding to a 1.66 ms. time-slot duration, and, consequently, a 26.66 ms. frame duration. Each time-slot 202 is divided into two half-time-slots 202a, 202b, with pilot bursts 204a, 204b transmitted within each half-time-slot 202a, 202b. Each pilot burst 204a, 204b is 96 chips long, centered about a mid-point of its associated half-time-slot 202a, 202b. The pilot bursts 204a, 204b comprise a pilot channel signal covered by a code, e.g., a Walsh code with index 0. A forward medium access control channel (MAC) 206 forms two bursts, which are transmitted immediately before and immediately after the pilot burst 204 of each half-time-slot 202. The MAC is composed of up to 64 code channels, which are orthogonally covered by 64-ary code, e.g., Walsh code. Each code channel is identified by a MAC index, which has a value between 1 and 64, and identifies a unique 64-ary covering Walsh code. A reverse power control channel (RPC) is used to regulate the power of the reverse link signals for each subscriber station. The RPC is assigned to one of the available MACs, e.g., MAC with MAC index between 5 and 63. A Reverse Activity (RA) Channel is used to regulate the reverse link rate of data for each subscriber station by transmitting a reverse link activity bit (RAB) stream. The RA channel is assigned to one of the available MACs, e.g., MAC index 4. The forward link traffic channel or the control channel payload is sent in the remaining portions 208a of the first half-time-slot 202a and the remaining portions 208b of the second half-time-slot 202b. The traffic channel carries user data, while the control channel carries control messages, and may also carry user data. The control channel is transmitted with a cycle defined as a 256 slot period at a data rate of 76.8 kbps or 38.4 kbps. The term user data, also referred to as traffic, is information other than overhead data. The term overhead data is information enabling operation of entities in a communication system, e.g., call maintenance signaling, diagnostic and reporting information, and the like.

Packed Grant Channels and Automatic
Retransmission reQuest

As discussed, the communication system may need to support both access terminals operating the reverse link in accordance with the IS-856 standard—legacy access terminals, and access terminals operating the reverse link in accordance with the described concept—new access terminals. To support such an operation, an additional channel, a packet grant (PG) channel, is needed on the forward link. The PG channel may be provided by changing modulation of one of the above-mentioned MAC channels, e.g., the RPC channel, from binary phase-shift keying (BPSK) to a quadrature-phase shift keying (QPSK). When a second portion of a reverse link interval is dedicated to only one access terminal (see below), only one PG channel, a primary PG channel, is needed.

Figure 3:
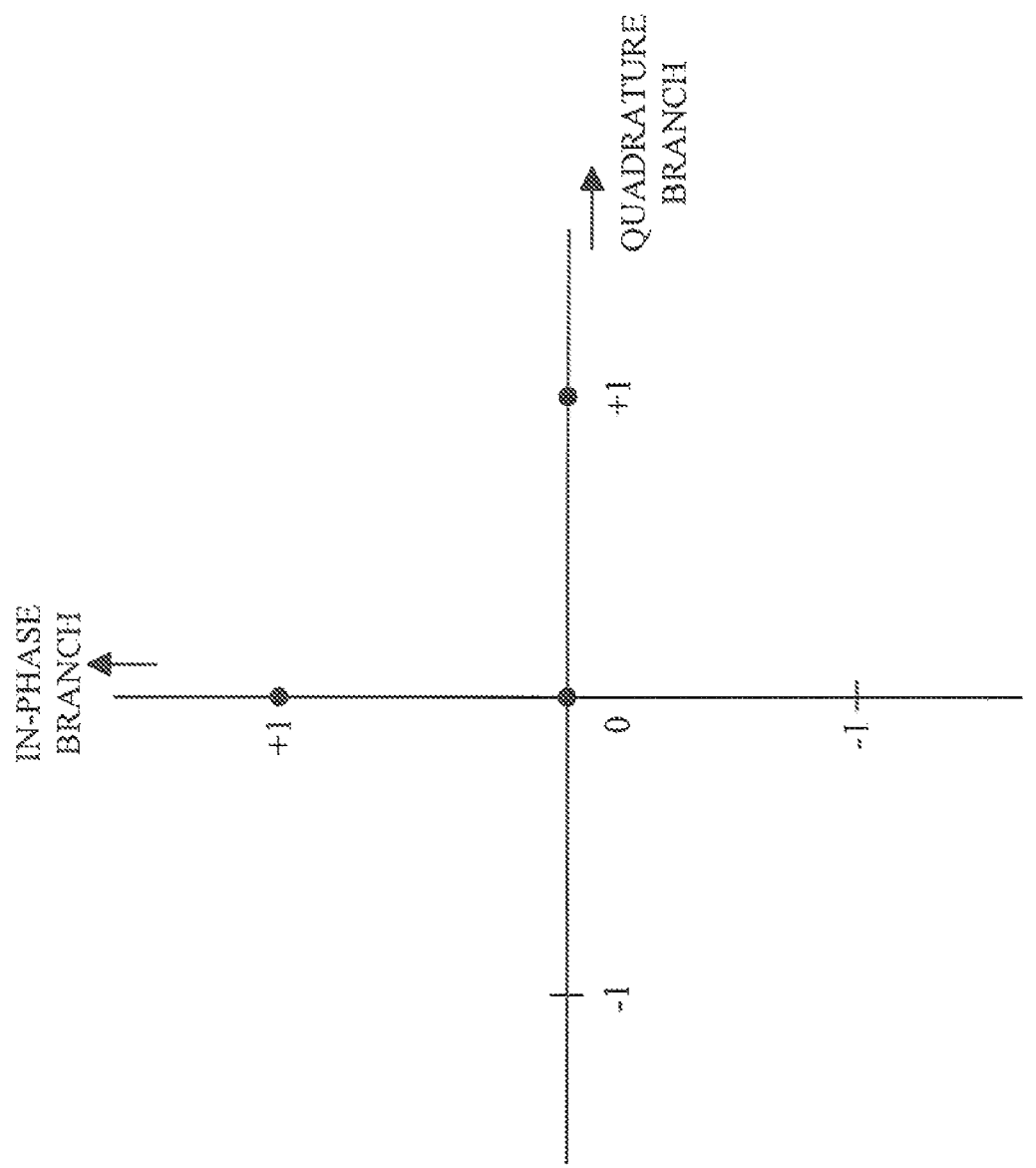
FIG. 3 illustrates a method of communicating power control commands and packet grant commands over a reverse power control channel.

The power control commands are modulated on the in-phase branch of the RPC channel assigned to an access terminal. The power control command information is binary, wherein a first value of a power control bit ("up") commands the access terminal to increase the access terminal's transmit power by a first determined amount and a second value of a power control bit ("down") commands the access terminal to decrease the access terminal's transmit power by a second determined amount. As illustrated in FIG. 3, the "up" command is represented as +1; the "down" command is represented as −1. However, other values may be used.

The primary PG channel is communicated over the quadrature branch of the RPC channel assigned to the access terminal. Information transmitted on the primary PG channel is ternary. As illustrated in FIG. 3, the first value is represented as +1, the second value is represented as 0, and the third value is represented as −1. The information has the following meaning to both the access point and the access terminal:

+1 means that permission to transmit a new packet has been granted;

0 means that permission to transmit a packet has not been granted; and

−1 means that permission to transmit a previously transmitted packet (re-transmission) has been granted.

The above described signaling, in which transmission of information value 0 requires no signal energy, allows the access point to assign energy to the primary PG channel only when transmitting an indication to transmit a packet. Because only one or a small number of access terminals are granted permission to transmit on the reverse link in a time interval, the primary PG channel requires very little power in order to provide reverse link transmission information. Consequently, sufficient power can be allocated to the primary PG channel to ensure reliable reception of the primary PG channel at the Access Terminals without undue disturbance of power allocation. Consequently, impact on the RPC power allocation method is minimized. The RPC power allocation method is disclosed, e.g., in co-pending U.S. patent application Ser. No. 09/669,950, entitled "Methods and apparatus for allocation of power to base station channels", filed Sep. 25, 2000 and co-pending U.S. patent application Ser. No. 10/263,976, entitled "Power Allocation for Power Control Bits in a Cellular Network", filed Oct. 2, 2002, both assigned to the present assignee. Furthermore, the access terminal is required to perform a ternary decision on the quadrature stream only when the access terminal is expecting a response, following a data transmit request, or when the access terminal has a pending data transmission. However, it will be appreciated that the choice of the ternary values is a design choice, and values, other than the ones described may be used instead.

The access terminal receives and demodulates the RPC/primary PG channel from all access points in the access terminal's active set. Consequently, the access terminal receives the primary PG channel information conveyed over the quadrature branch of the RPC/primary PG channel for every access point in the access terminal's active set. The access terminal may filter the energy of the received primary PG channel information over one update interval, and compare the filtered energy against a set of thresholds. By appropriate choice of the thresholds, the access terminals that have not been granted permission for transmission, decode the primary PG channel value as 0 with high probability.

The information conveyed over the primary PG channel is further used as a means for Automatic Re-transmission reQuest.

When the reverse link transmission of a packet from an access terminal is being received only by a serving access point, the serving access point generates and transmits permission to transmit a new packet as a response to an access terminal's request to transmit a packet when the previous packet from the access terminal was received correctly. In this case, such information on the primary PG channel serves as an acknowledgement (ACK). The serving access point generates and transmits permission to re-transmit the previous packet as a response to the access terminal's request to transmit a packet if the previous packet from the access terminal was received incorrectly. Such information on the primary PG channel serves as a negative-acknowledgement (NACK). Therefore, no separate ACK/NACK channel is necessary.

Alternatively, the reverse link transmission of a packet from an access terminal may be received at plurality of access points.

When a non-serving access point receives and decodes the reverse link from the transmitting access terminal, the non-serving access point provides information whether or not the user data were successfully decoded to the serving access point. The serving access point then sends an ACK/NACK to the access terminal on the primary PG channel.

Alternatively, the access point(s) that received the payload information sends the payload information to centralized entity to perform soft-decision decoding. The centralized entity then notifies the serving access point whether the payload decoding was successful. The serving access point then sends an ACK/NACK to the access terminal on the primary PG channel.

Alternatively, upon decoding the reverse link, the non-serving access point may autonomously send an ACK/NACK to the access terminal on the primary PG channel. It is, therefore, possible that an access terminal receives conflicting information on the primary PG channel, e.g., because some access points failed to correctly receive the access terminal's transmission, because the information on the primary PG channel was erased or incorrectly received, or for other known reasons. Consequently, the information transmitted in response to the reverse link transmission over the primary PG channel is interpreted differently when transmitted by a serving or non-serving access point. Because, from the access network perspective it does not matter, which access point received the access terminal's transmission, when the access terminal receives information on the primary PG channel interpreted as an ACK from any access point, it transmits a new packet at the next transmission grant, although the serving access terminal may have sent a permission to re-transmit a previously transmitted packet.

Because the access terminal makes a ternary decision on a primary PG channel received from a serving access point and a binary decision on a primary PG channel received from an access point, the access terminal may use different thresholds for the ternary decisions and the binary decision.

When a second portion of a reverse link interval is dedicated to only one access terminal (see below), the above-described PG channel provides satisfactory information. However, when the second portion of the reverse link interval is dedicated to multiple access terminals, additional information, namely, which of the access terminals that received a permission to transmit is to transmit in which sub-division of the second portion of the reverse link interval. Such information may be provided on a supplemental PG channel.

A structure of the supplemental PG channel is exactly the same as the above-described PG channel, except the supplemental PG channel has a different MAC index. Referring back to FIG. 3, the supplemental PG channel information is communicated over the both the in-phase and the quadrature branch. The information is interpreted together with the information acquired from the PG channel as follows:

when the PG channel informs the access terminal that permission to transmit a packet has not been granted, the supplemental PG channel information is ignored;

when the PG channel informs the access terminal that that permission to transmit a new packet or the permission to transmit a previously transmitted packet (re-transmission) has been granted, then:

0 means that the access terminal is to use the entire second portion of the reverse link interval;

any of the remaining four values identifies one of four sub-divisions of the second portion of the reverse link interval.

Therefore, the above-described signaling can support four sub-divisions of the second portion of the reverse link interval. Should more sub-divisions be required, an additional supplemental PG channels may be added.

The PG channels, i.e., the MAC indexes, may be assigned to an access terminal upon the access terminal's accessing the communication system. Alternatively, the PG channel may be assigned to the access terminal, and the supplemental PG channels may be determined by the access terminal from the MAC index of the PG channel, e.g., by adding a determined offset to the PG channel.

Reverse Activity Channel

As described, above, a communication system in accordance with IS-856 standard uses a Reverse Activity Channel to regulate the reverse link rate of data for each subscriber station by transmitting a reverse link activity bit (RAB) stream. This Reverse Activity Channel is sufficient if only new terminals, transmitting in intervals designated for TDMA, are operating in the communication system. However, to support both legacy access terminals, and new access terminals transmitting in intervals designated for TDMA, an additional channel is needed on the forward link.

To support the reverse link rate of data for new access terminals transmitting in intervals designated for TDMA may require that the Reverse Activity Channel supports transmission of a value, regulating the rate of data, requiring more than one bit. Because it may be desirable not to change design of the forward link unduly, the additional Reverse Activity Channel may have the same structure as the legacy Reverse Activity Channel, but would be assigned a different MAC index. Because such a Reverse Activity Channel supports transmission of one bit only, the multi-bit value may be transmitted over several transmission instances of the Reverse Activity Channel.

The above-described forward link 200 is a modification of a forward link of a communication system in accordance with IS-856 standard. The modification is believed to have the least impact on the forward link structure, and consequently requires the least changes to the IS-856 standard. However, it will be appreciated that the teaching is applicable to different forward link structures. Thus, for example, the above-described forward link channels may be transmitted not sequentially but simultaneously. Additionally, any forward link structure, enabling communication of information provided in the PG, supplemental PG, and RA channel, e.g., a separate PG and ACK/NACK code channels, a new RA channel different from the legacy RA channel, may be used instead.

Reverse Link

As discussed above, quality and effectiveness of a data transfer is dependent on conditions of the channel between a source terminal and a destination terminal. Channel conditions depend on interference and path loss, both of which are time-variant. Therefore, the reverse link performance may be improved by methods to mitigate interference. On the reverse link, all access terminals in an access network may simultaneously transmit on the same frequency (one frequency reuse set) or multiple access terminals in the access network may simultaneously transmit on the same frequency (frequency reuse set greater than one). It is noted that the reverse link as described herein may utilize any frequency reuse. Therefore, any access terminal's reverse link transmission is subject to several sources of interference. The most dominant sources of interference are:

transmission of code-division multiplexed overhead channels from other access terminals both from the same-cell and from other-cells;

transmission of code-division multiplexed user data by access terminals in the same-cell; and transmission of code-division multiplexed user data by access terminals from other-cells.

Studies of reverse link performance in the code-division multiple access (CDMA) communication systems indicate that eliminating same-cell interference may achieve a significant improvement in the quality and effectiveness of the data transfer. Same-cell interference in the communication system employing CDMA, i.e., communication system in accordance with the IS-856 standard, may be mitigated by limiting the number of access terminals that may simultaneously transmit on the reverse link.

Because two modes of operation, i.e., limiting the number of simultaneously transmitting access terminals and allowing all access terminals to transmit simultaneously exists, the access network needs to indicate to the access terminals, which mode is to be used. The indication is communicated to the access terminals in periodic intervals, i.e., in a pre-determined portion of a forward link channel, e.g., every control channel cycle. Alternatively, the indication is communicated to the access terminals only upon change by a broadcast message in a forward link channel, e.g., a reverse power control channel.

When operating in the limiting mode, the above-described packed grant forward link channel may be utilized to provide permission or denial to transmit to the access terminals requesting permission to transmit.

The same-cell interference may also be mitigated by time-division-multiplexing traffic channel and overhead channels of the reverse link and by scheduling, which of the access terminals requesting transmission are allowed to transmit user data or traffic in the reverse link time interval, e.g., a frame, a time-slot, or any time interval supported by the communication system. The scheduling may take into account the entire access network, and may be carried out by a centralized entity, e.g., the access network controller 110. Such a scheduling method minimizes interference due to terminals transmitting in adjacent sectors of a cell. Alternatively, the scheduling may take into account a part of the access network comprising only one access point, and can be carried out by either a centralized entity or a de-centralized entity, e.g., an access point controller. Such a scheduling method mitigates only same-cell interference. Furthermore, a combination of the two methods may be used, where several access points, but not the entire network are scheduled by one entity.

It will be appreciated that the number of access terminals permitted to transmit in a time interval influences the interference on the reverse link, and, consequently the quality of service (QoS) on the reverse link. Therefore, the number of access terminals permitted to transmit is a design criterion. Consequently, such a number can be adjusted by the scheduling method in accordance with changing conditions and/or requirements on QoS.

Additional improvements may be achieved by mitigating other-cell interference. The other-cell interference during user data transmissions is mitigated by opportunistic transmission, control of maximum transmit power and rate of user data for each access terminal within a multi-sector cell. An "opportunistic transmission" (and multi-user diversity) implies scheduling an access terminal's transmissions in time interval(s) in which a determined opportunity threshold is exceeded. A time interval may be deemed to be opportune if a metric, determined in accordance with an instantaneous quality metric of the reverse link channel in the time interval, an average quality metric of that reverse link channel, and a function enabling differentiation between users (such as an impatience function described below), exceeds an opportunity threshold. The method enables the access terminal to transmit user data at a lower transmit power and/or to complete the transmission of a packet using fewer time intervals. The lower transmit power and/or completion of a packet transmission in fewer time intervals results in reduced interference from the transmitting access terminals in sectors of the multi-sector cell, and, therefore, in lower overall other-cell interference to access terminals in adjacent cells. Alternatively, the better than average channel conditions allow the terminal to utilize the available power to transmit at a higher data rate, thus, causing the same interference to other-cells as the access terminal would cause by utilizing the same available power to transmit at a lower data rate during an inopportune transmit interval In addition to mitigating interference on the reverse link channels, the path loss and the variation of the path loss may be exploited by multi-user diversity to increase throughput. "Multi-user diversity" results from the diversity of channel conditions among the access terminals due to, e.g., different locations experiencing different shadowing and fading as a function of time. The diversity in channel conditions among user terminals allows scheduling an access terminal's transmissions at time intervals, during which the access terminal's channel conditions satisfy determined criteria that allow for transmissions with less power or higher rate of data, thus improving spectral efficiency of reverse link transmissions. Such criteria comprises the quality metric of an access terminal's reverse link channel being better in relation to the average quality metric of the access terminal's reverse link channel.

A design of a scheduler may be used to control access terminals QoS. Thus, for example, by biasing the scheduler towards a subset of the access terminals, the subset may be given transmission priority, although the opportunity reported by these terminals may be lower than opportunity reported by terminals not belonging to the subset. It will be appreciated that a similar effect may be achieved by employing an impatience function discussed below. The term subset is a set whose members comprise at least one but up to all members of another set.

Even employing an opportunistic transmission method, the transmitted packet may be received erroneously and/or erased at an access point. The term erasure is failure to determine a content of the message with a required reliability. This erroneous reception stems from the inability of an access terminal to accurately predict the quality metric of the access terminal's reverse link channel due to the other-cell interference. The other-cell interference is difficult to quantify in a communication system in which, the transmissions of access terminals from sectors belonging to different multi-sector cells are unsynchronized, short, and uncorrelated.

To mitigate the incorrect channel estimation and provide interference averaging, Automatic Re-transmission reQuest (ARQ) methods are often used. ARQ methods detect missing or erroneously received packet(s) at a physical layer or a link layer and request re-transmission of these packets from the transmitting terminal.

Layering is a method for organizing communication protocols in well-defined encapsulated data units between otherwise de-coupled processing entities, i.e., layers. The protocol layers are implemented in both access terminals and access points. In accordance with the Open Systems Interconnection (OSI) model, protocol layer L1 provides for the transmission and reception of radio signals between the base station and remote station, layer L2 provides for the correct transmission and reception of signaling messages, and layer L3 provides for the control messaging for the communication system. Layer L3 originates and terminates signaling messages according to the semantics and timing of the communication protocol between access terminals and access points.

In an IS-856 communication system, the air interface signaling layer L1 is referred to as the Physical Layer, L2 is referred to as the Link Access Control (LAC) Layer or the Medium Access Control (MAC) Layer, and L3 is referred to as the Signaling Layer. Above the Signaling Layer are additional layers, which in accordance with the OSI model are numbered L4-L7 and are referred to as the Transportation, Session, Presentation and Application Layers. A physical layer ARQ is disclosed in U.S. patent application Ser. No. 09/549,017, entitled "Method and Apparatus for Quick Retransmission of Signals In A Communication System", filed Apr. 14, 2000, assigned to the present assignee. An example of a link layer ARQ method is the Radio Link Protocol (RLP). RLP is a class of error control protocols known as not-acknowledge (NAK) based ARQ protocols. One such RLP is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2. The transmissions of both the original and the retransmitted packets may be opportunistic.

Reverse Link Transmission

The reverse link user data transmission from the legacy access terminals utilizes a code-division multiple access (CDMA), e.g., the CDMA in accordance with the IS-856 standard.

The new access terminals may utilize several multiple access methods of the reverse link channel in accordance with the options enabled by the communication system. First, the new access terminals may utilize the CDMA used by the legacy terminal, e.g. the CDMA in accordance with the IS-856 standard.

Additionally, the communication system may enable a reverse link operation designed primarily for a Time Division Multiple Access (TDMA). Such an operation is enabled by dividing the reverse link into intervals, and associating each of the intervals with a CDMA or a TDMA. The control entity in an access network, e.g., the access network controller 110, makes a decision, specifying an assignment of a sequence of the CDMA and TDMA intervals. The decision is made in accordance with a reverse link condition of the specific access terminal, the number and activity of legacy terminals, and other design criteria of the communication system. The reverse link condition may be ascertained in accordance with erasure rate of the DRC channel. The design criteria may comprise, e.g., a hand-off state of the specific access terminal, reverse link loading, and other criteria known to one skilled in the art. Clearly, the distribution may comprise only intervals associated with one of the multiple-access method.

The control entity in the access network then advises the access terminals about the assignment, by communicating the distribution to all access terminals of the access network. Alternatively, the assignment is communicated to new access terminals only. The assignment is communicated in periodic intervals, i.e., in a pre-determined portion of a forward link channel, e.g., every control channel cycle. Alternatively, the assignment is communicated to the access terminals only upon change by a broadcast message in a forward link channel, e.g., the control channel. The number of bits in the message (Indicator bits) is dependent on number of different sequences.

The new access terminals receive the assignment information and, if not given the choice to select between the CDMA and the TDMA operation autonomously, enter the multiple-access specified in the assignment information. If the access terminal is given a choice to select between the CDMA and the TDMA operation, the new access terminal autonomously makes the decision in accordance with design criteria of the communication system. Such criteria may comprise, e.g., power amplifier headroom, a forward link quality metric, a hand-off state of the new access terminal, reverse link quality metric, amount of data to be transmitted, impatience function value, QoS requirements and other known design criteria. Thus, for example, the new access terminals whose link-budget enables reverse link transmission at a rate of data above a threshold may utilize TDMA; otherwise, the new access terminals may utilize CDMA. Furthermore, a new access terminal able to utilize the TDMA, but having data packet size too small for high data rate, may select the CDMA. Additionally, the AT may select CDMA for low-latency applications.

Reverse Link Channels

As discussed above, the legacy access terminals operate in accordance with the IS-856 standard, consequently, the reverse link waveform for the legacy terminals is identical to the reverse link waveform of the IS-856 standard and is not described in detail herein.

Additionally, those of the new access terminals utilizing a code-division access, e.g., the CDMA in accordance with the IS-856 standard utilize the reverse link waveform identical to the reverse link waveform of the IS-856.

Figure 4A:
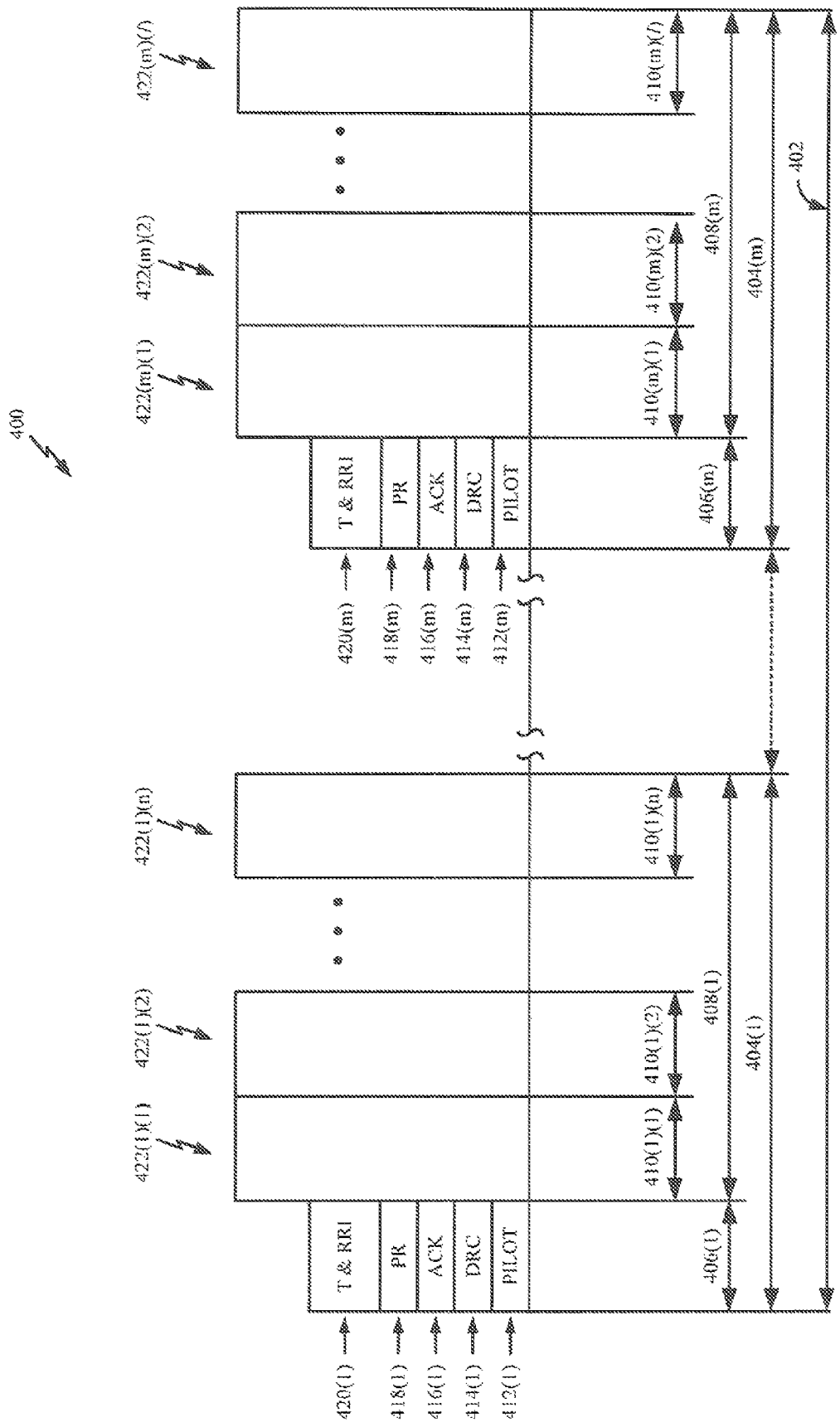
FIGS. 4a-4d illustrate an embodiment of a reverse link waveform.
Figure 4B:
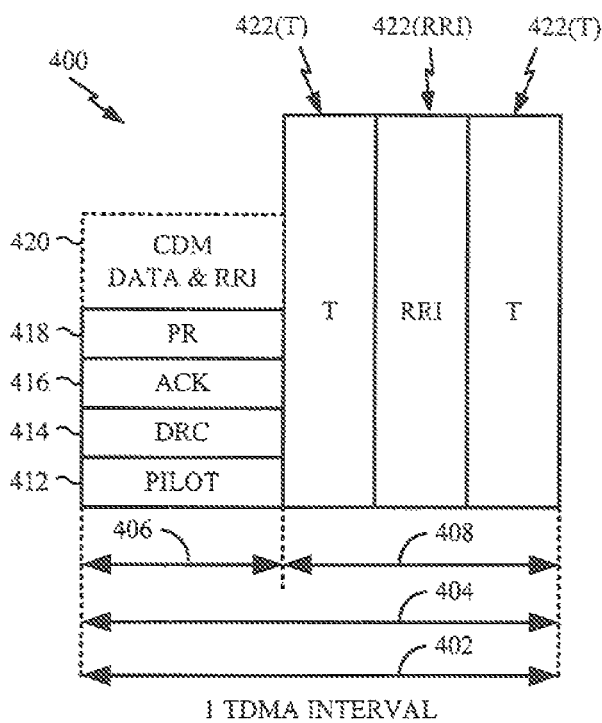
Figure 4C:
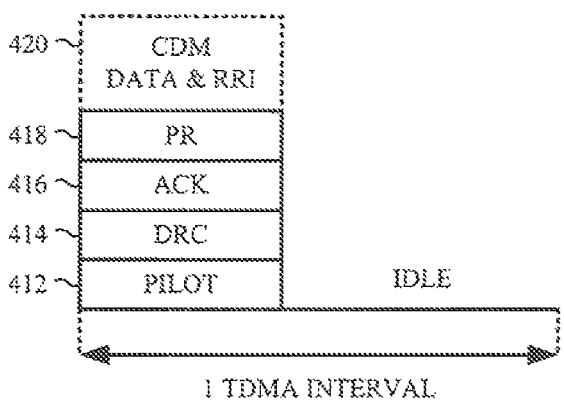

An exemplary reverse link waveform for the new access terminals operating in TDMA interval is illustrated in FIGS. 4a-c. It will be appreciated that the below described time durations, chip lengths, value ranges are given in a way of example only, and other time durations, chip lengths, value ranges may be used without departing from the underlying principles of operation of the communication system.

The reverse link 400 is defined in terms of intervals 402. An interval is a structure comprising a pre-determined number of time-slot 404. As illustrated in FIG. 4a, the interval comprises m time-slots, however, the number of time-slots is a design decision; consequently, any number of slots may comprise an interval. Each time-slot 404(1), ..., 404(m) is divided into two portions 406, 408. The first portion 406 comprises overhead channels 412-418, and an optional traffic channel accompanied with additional overhead channel 420.

The reverse link overhead channels comprise: a Pilot Channel (PC) 412, a Data Request channel (DRC) 414, an Acknowledgement channel (ACK) 416, a Packet Request channel (PR) 418. Optionally, a traffic channel accompanied by a Reverse Rate Indication channel (RRI), collectively indicated by reference 420 may be also included in the first portion 406.

The second portion 408 is further divided into sub-divisions 410, each sub-division 406 carrying a traffic channel and accompanying Reverse Rate Indication channel (RRI) 422 of an access terminal. As illustrated in FIG. 4a, there are n sub-divisions 410 in the second portion 408(1) of the first time-slot 404(1); consequently, n different access terminals may transmit in the second portion 408(1) of the interval 404(1); there are/sub-divisions 410 in the second portion 408(m) of the m-th time-slot 404(m); consequently, n different access terminals may transmit in the second portion 408(m) of the interval 404(m). The access network in accordance with scheduler design may vary the number of sub-divisions 410. One sub-division means that the whole second portion of the interval is used by one access terminal. The additional traffic channel and accompanying RRI channel provided in the sub-divisions 410 may utilize TDM, OFDM, CDM or any other multiplexing format.

FIG. 4b illustrates a specific TDMA interval 402. The TDMA interval comprises one time-slot 404. The time-slot 404 is 2048 chips long, corresponding to a 1.66 ms. time-slot duration. Each time-slot 404 is divided into two portions 406, 408, each portion being equal to half-time-slot. Because the second portion 408 is not further sub-divided, the second portion 408 corresponds to $1^{st}$ sub-division 410.

The overhead channels as described above are distinguished by different codes, e.g., by being covered by different Walsh codes, and organized in the first portion 406. The optional traffic channel, accompanied by a Reverse Rate Indication channel (RRI), collectively indicated by reference 420 may be also included in the first portion 406. The RRI is punctured into the traffic channel, and the resulting structure 420 is a distinguished from the overhead channels by different code, e.g., by being covered by different Walsh code. Consequently, the traffic channel and the RRI channel 420 are referred to as a CDM traffic channel, respective a CDM/RRI channel. Alternatively, (not shown) the RRI channel is not punctured into the CDM traffic. Consequently, the CDM traffic channel and the RRI channel are distinguished by each being covered by a by a unique code.

Additional traffic channel 422(T) and accompanying Reverse Rate Indication channel (RRI) 422(RRI) are provided in the second half-time-slot 408. As illustrated in FIG. 4b, the traffic channel 422(T) and accompanying RRI channel 422(RRI) are time division multiplexed, and are referred to as a TDM traffic channel, respective a TDM/RRI channel.

Although not shown, the additional traffic channel and accompanying RRI channel provided in the second half-time-slot 408 may utilize OFDM, CDM or any other modulation format (not shown). Additionally, as described below, the additional traffic channel and accompanying RRI channel provided in the second half-time-slot 408 may utilize different multiplexing format, e.g., TDM and OFDM depending on rate of data.

FIG. 4c illustrates a reverse link waveform for access terminals operating in TDMA interval, but carrying no data in the second half-time-slot 408. As illustrated, the overhead channels 406-418 and the optional CDM traffic channel/CDM RRI channel 420 are still transmitted during the first half-time-slot 406, no energy is transmitted in the second half-time-slot 408.

Consequently, to build user data into an interval designated for TDMA, the new access terminal may utilize three different protocols (modes) of multiplexing user data in such an interval:

build user data into a first portion of the interval using a Code-division multiplexing (CDM);
build user data into a second portion of the interval using a Time-division multiplexing (TDM) or Orthogonal Frequency Division Multiplexing (OFDM); and
building user data into a first data portion of an interval using CDM and into a second portion of the interval using TDM/OFDM.

Figure 4D:
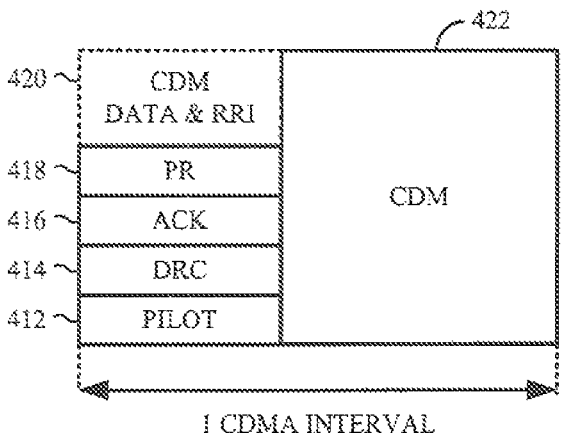

FIG. 4d illustrates a reverse link waveform for new access terminals operating in CDMA interval, and carrying CDM user data in both half-time-slots 406, 408. As illustrated, the overhead channels 412-418 and the optional CDM traffic channel/CDM RRI channel 420 are transmitted during the first half-time-slot 406. Additional CDM channel 422 is transmitted in the second half-time-slot 408.

Although not shown in FIG. 4d, the new access terminal may utilize CDM traffic channel, i.e., to build user data into an interval designated for CDMA using CDM by:

building user data into a first portion of the interval 406;
building user data into a first portion of the interval 408; and
building user data into both the first portion 406 and the second portion 408.

The data transmitted in the CDM portion and the TDM/OFDM portion of the time-slot may contain data pertaining to the same information content, e.g., video. Additionally, a base video may be transmitted in the CDM portion of the time-slot and enhanced video in the TDM/OFDM portion of the time-slot; consequently, an acceptable video may still be received if the terminal cannot transmit during the second half of the time-slots. Alternatively, each half may contain data pertaining to different information content. Thus, e.g., voice data may be transmitted in the CDM portion of the time-slot and video may be transmitted in the TDM/OFDM portion of the time-slot.

Pilot Channel

Figure 5A:
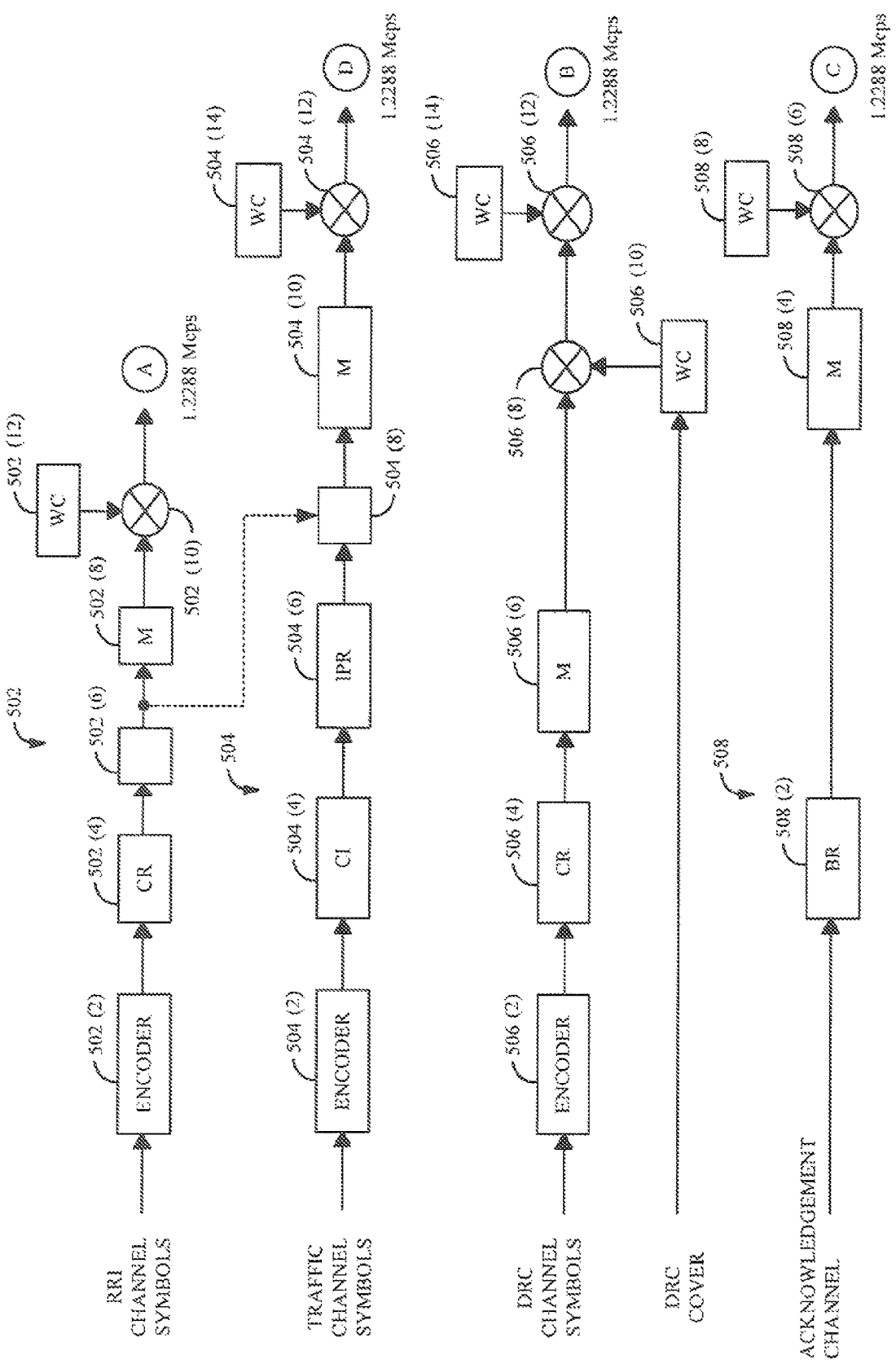
Figure 5B:
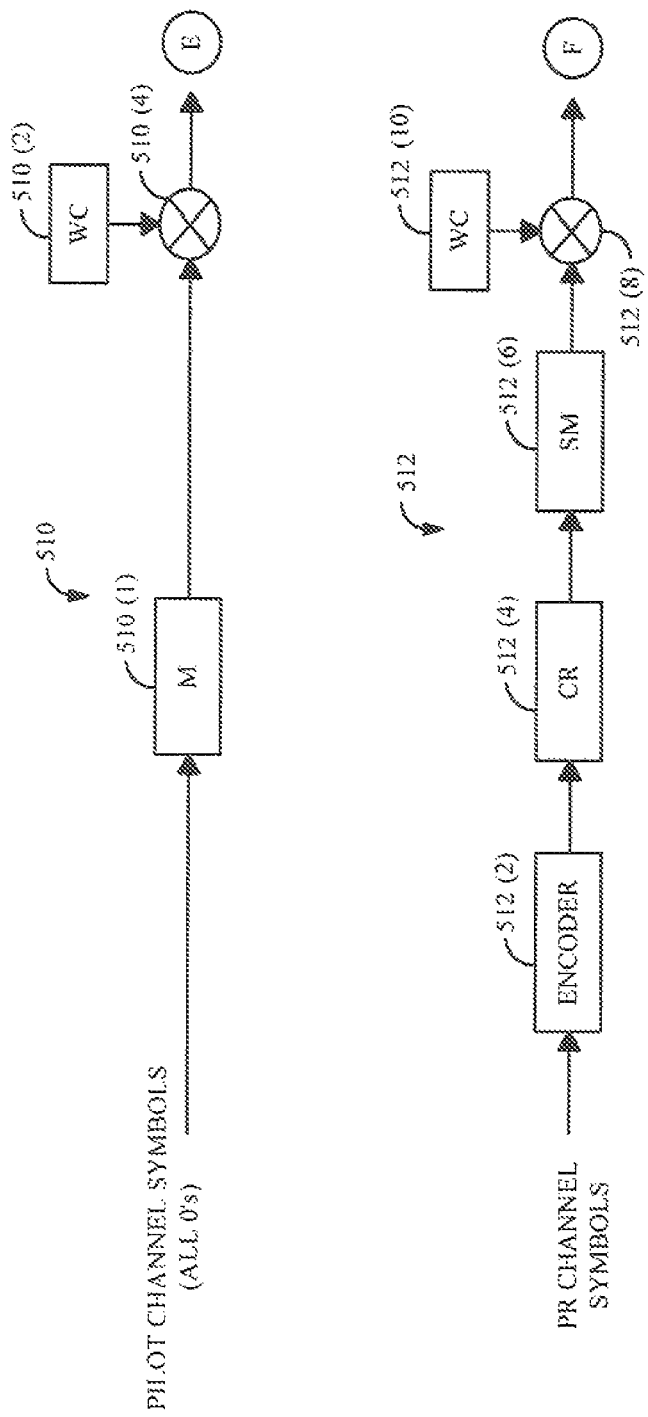

In one embodiment, the Pilot Channel 412 is used for estimation of a reverse link channel quality. Additionally, the Pilot Channel 412 is used for coherent demodulation of the channels transmitted in the first half-time-slot 406. The Pilot Channel 412 comprises unmodulated symbols with a binary value of '0'. Referring to FIG. 5, the unmodulated symbols are provided to a block 510(1), which maps the binary symbols onto modulation symbols in accordance with the selected modulation. For example, when the selected modulation is binary shift phase keying (BPSK) the binary symbol value '0' is mapped on a modulation symbol value +1, and '1' binary symbol valued '1' is mapped on a modulation symbol value −1. The mapped symbols are covered with a Walsh function generated by a block 510(2), in block 510(4). The Walsh covered symbols are then provided for further processing.

Data Request Channel

The Data Request Channel 414 is used by the access terminal to indicate to the access network the selected serving sector and the requested data rate on the Forward Traffic Channel. The requested Forward Traffic Channel data rate comprises, e.g., a four-bit DRC value. Referring to FIG. 5, the DRC values are provided to a block 506(2), which encodes the four-bit DRC value to yield bi-orthogonal code words. The DRC codeword is provided to a block 506(4), which repeats each of the codeword twice. The repeated codeword is provided to a block 506(6), which maps the binary symbols onto modulation symbols in accordance with the selected modulation. The mapped symbols are provided to a block 506(8), which covers each symbol with a code, e.g., a Walsh code generated by a block 506(10), in accordance with a DRCCover identified by index i. Each resulting Walsh chip then provided to block 506(12), where the Walsh chips are covered by a different code, e.g., a different Walsh code, generated by a block 506(14). The Walsh covered symbols are then provided for further processing.

ACK Channel

The ACK channel 416 is used by the access terminal to inform the access network whether user data transmitted on the Forward Traffic Channel has been received successfully or not. The access terminal transmits an ACK channel bit in response to every Forward Traffic Channel interval that is associated with a detected preamble directed to the access terminal. The ACK channel bit is set to +1 (ACK) if a Forward Traffic Channel packet has been successfully received; otherwise, the ACK channel bit is set to −1 (NAK). A Forward Traffic Channel user data are considered successfully received if a CRC protecting the transmitted user data is identical to the CRC calculated from the decoded user data. Referring to FIG. 5, the ACK channel bit is repeated in a block 508(2), and provided to a block 508(4). Block 508(4) maps the binary symbols onto modulation symbols in accordance with the selected modulation. The mapped symbols are then provided to a block 508(6), which covers each symbol with a Walsh code generated by block 508(8). The Walsh covered symbols are then provided for further processing.

Packet Ready Channel

Each access terminal desiring to transmit indicates to the serving sector that user data are available for transmission in a future interval and/or that the future interval transmission is opportune. A interval is deemed to be opportune if an instantaneous quality metric of the reverse link channel interval exceeds the average quality metric of that reverse link channel modified by an opportunity level determined in accordance with additional factors, depending on a design of the communication system, exceeds a threshold.

The quality metric of the reverse link is determined in accordance with a reverse pilot channel, e.g., in accordance with an equation (1):

$$\frac{Filt\_TX\_Pilot(n)}{TX\_Pilot(n)} \qquad (1)$$

where Tx_Pilot(n) is the power at which the pilot channel is transmitted during an n-th interval; and Filt_Tx_Pilot(n) is the power of the filtered pilot signal filtered over the past k intervals evaluated in n-th interval. The filter time-constant, expressed in slots, is determined to provide adequate averaging of the reverse link channel.

Consequently, Equation (1) indicates how much better or worse the instantaneous reverse link is with respect to the average reverse link. The access terminal performs the Tx_Pilot(n) and Filt_Tx_Pilot(n) measurements, and the quality metrics calculation in accordance with Equation (1) at every interval. The calculated quality metric is then used to estimate quality metrics for a pre-determined number of intervals in the future. The pre-determined number of intervals may be two. A method for such quality estimation is described in detail in U.S. patent application Ser. No. 09/974,933, entitled "Method and Apparatus for Scheduling Transmissions Control in a Communication System", filed Oct. 10, 2001, assigned to the present assignee.

The above-described method of estimating the reverse link quality metric is given by way of example only. Thus, other methods may be used. For example, the access terminals may provide an information about the pilot channel and the traffic channel transmit power levels to the access point that then uses this information to determine opportune transmit intervals.

The factors determining the opportunity level comprise, e.g., a maximum acceptable transmission delay t (from arrival of a packet at the access terminal to the packet transmission), a number of packets in the queue at the access terminal I (transmit queue length), and an average throughput over the reverse link th. The above-mentioned factors define an "impatience" function I(t,I,th). The impatience function I(t,I,th) is determined in accordance with the desired influence of the input parameters. For example, immediately following a first packet arrival for transmission to the access terminal's queue, the impatience function has a low value, but the value increases if the number of packets in the access terminal's queue exceeds a threshold. The impatience function reaches a maximum value when the maximum acceptable transmission delay is reached. Queue length parameter and transmit throughput parameter affect the impatience function similarly.

Use of the above-mentioned three parameters as inputs to the impatience function is given for the purposes of explanation only; any number or even different parameters may be used in accordance with design considerations of a communication system. Additionally, the impatience function may be different for different users, thus providing user differentiation. Furthermore, functions other than the impatience function may be used to differentiate among users. Thus, for example, each user may be assigned an attribute in accordance with the user's QoS. The attribute itself may serve in lieu of the impatience function. Alternatively, the attribute may be used to modify the input parameters of the impatience function.

The impatience function I(t,I,th) may be used to modify the quality metric in accordance with equation (2):

$$\frac{\text{Filt\_TX\_Pilot}(n)}{\text{TX\_Pilot}(n)} \cdot I(t, l, th) \qquad (2)$$

The relationship between the values calculated from Equation (2) and a threshold $T_j$ can be used to define opportunity levels. A set of suitable opportunity levels is given in Table 1 as a way of example. It will be appreciated that different number and different definitions of opportunity levels may be used instead.

TABLE 1

| Opportunity Level | Definition |
| --- | --- |
| 0 | No Data to Transmit |
| 1 | Data available for transmission |
| 2 | Data available for transmission, channel condition "GOOD" OR Impatience to transmit "HIGH" |
| 3 | Data available for transmission, channel condition "VERY GOOD" OR Impatience to transmit "VERY HIGH" |

The appropriate opportunity level is encoded and transmitted over the PR channel. The PR channel is transmitted if an opportunity level other than 0, i.e., "no data to transmit" is to be indicated. The above-described four opportunity levels may be represented as two information bits. The PR channel needs to be received at an access point with a high reliability because any error during the PR channel reception may result in possible scheduling of an access terminal that has not requested user data transmission or reported low opportunity level. Alternatively, such an error can result in failure to schedule an access terminal that reported high opportunity level. Consequently, the two information bits need to be delivered with sufficient reliability.

As described above, the opportune transmit interval is implied because both the access point and the access terminal have knowledge of a pre-determined number of intervals in the future, for which the opportune level has been estimated. Because the timing of the access points and access terminals is synchronized, the access point is able to determine which interval is the opportune transmit interval for which the transmit terminal reported the opportunity level. However, it will be appreciated that other arrangements may be employed, in which the opportune transmit interval is variable, and is explicitly communicated to the access point.

The PR channel 418 value in accordance with the above-described concepts is expressed as a 2-bit value. Referring to FIG. 5, The PR value is provided to a block 512(2), which encodes the 2-bits to provide a codeword. The codeword is provided to a block 512(4), which repeats each of the codeword. The repeated codeword is provided to a block 512(6), which maps the binary symbols onto modulation symbols in accordance with the selected modulation. The mapped symbols are then provided to a block 512(8), which covers each symbol with a Walsh code generated by block 512(10).

CDM Traffic Channel

The CDM Traffic Channel 420 is a packet-based, variable-rate channel. The user data packets for an access point are transmitted at rates of data selected from e.g., a set of rates of data 9.6, 19.2, 38.4, 76.8, and 153.6 kilo-bits per second (kbps).

Referring to FIG. 5, the data to be transmitted (data bits) are divided into blocks of a pre-determined size, and provided to a block 504(2). The block 504(2) may comprise a turbo-encoder. The output of the block 504(2) comprises code symbols. The code symbols are interleaved by a block 504(4). In one embodiment, the block 504(4) comprises a bit-reversal channel interleaver. Depending on the data rate and encoder code rate, the sequence of interleaved code symbols is repeated in block 504(6) as many times as necessary to achieve a fixed modulation symbol rate, and provided to a block 504(8). Block 504(8) is provided with the CDM RRI channel symbols, and punctures the CDM RRI channel symbols into the CDM Traffic Channel symbols. The punctured symbols are provided to a block 504(10), which maps the binary symbols onto modulation symbols in accordance with the selected modulation. The mapped symbols are then provided to a block 504(12), which covers each symbol with a Walsh code generated by block 504(14). The resulting chips are provided for further processing, described in details below. The CDM Traffic Channel/RRI Channel packets may be transmitted in one to multiple half-time-slots, depending on the user data-to-pilot ratio, the packet size, and a given data are determined.

CDM Reverse Rate Indication Channel

The CDM RRI channel 420, provides an indication of a reverse link packet type. The packet type indication provides the access point with information that assists the access point in determining if soft-decisions from a currently received packet can be soft-combined with the soft-decisions from previously received packet(s). Soft-combining takes advantage of values of energies at bit positions obtained from previously received and decoded packets (soft-decision values). An access point determines bit values (hard-decision) of a packet by comparing soft-decision values against a threshold.

If an energy corresponding to a bit is greater than the threshold, the bit is assigned a first value, e.g., '1', otherwise the bit is assigned a second value, e.g., '0'. The access point then ascertains, whether the packet decoded correctly, e.g., by performing a CRC check, or by any other equivalent or suitable method following decoding of the packet. If such test fails, the packet is considered erased. However, the access point saves the soft-decision values (if the number of re-transmission attempts for the packet is less than a maximum allowed attempts), and when the access point acquires soft-decision values of the current packet, it can combine the saved soft-decision values with the soft-decision values of the current packet and compare the combined soft-decision values against the threshold.

Methods of combining are well known and, therefore, need not be described here. One suitable method is described in detail in a U.S. Pat. No. 6,101,168, entitled "Method and Apparatus for Time Efficient Re-transmission Using Symbol Accumulation," assigned to the present assignee.

However, in order to meaningfully soft-combine packets, the access terminal must know that the packets comprise information that may be combined as well as a method of combining. The set of RRI values is determined in accordance the method of combination. The RRI channel may be similar to the RRI channel in accordance with IS-856 standard. Referring to FIG. 5, the RRI value represented, e.g., by 3 bits, is provided to a block 502(2), which encodes the 3-bits to provide a 7-bit codeword. An example of encoding is illustrated in Table 2.

TABLE 2

| RRI Symbol | RRI Codeword |
| --- | --- |
| 000 | 0000000 |
| 001 | 1010101 |
| 010 | 0110011 |
| 011 | 1100110 |
| 100 | 0001111 |
| 101 | 1011010 |
| 110 | 0111100 |
| 111 | 1101001 |

The codeword is provided to a block 502(4), which repeats each of the codeword. The repeated codeword is provided to a block 502(6), which provides the codeword to block 504(8) for puncturing to the CDM traffic channel. The blocks 502(8), 502(10), and 502(12) are not utilized.

Alternatively, the codeword is provided to a block 502(4), which repeats each of the codeword. The repeated codeword is provided to a block 502(6), which provides the codeword to block 502(8), which maps the binary symbols onto modulation symbols in accordance with the selected modulation. The mapped symbols are then provided to a block 504(10), which covers each symbol with a Walsh code generated by block 504(12). The resulting chips are provided for further processing, described in details below.

TDM Traffic Channel

The TDM Traffic Channel 422(RRI) is a packet-based, variable-rate channel. The user data packets for an access point are transmitted at rates of data selected from e.g., a set of rates of data 76.8, 153.6, 230.4, 307.2, 460.8, 614.4, 921.6, 1228.8, and 1843.2 kbps. The data to be transmitted (data bits) are divided into blocks of a pre-determined size, and provided to a block 504(2). The block 504(2) may comprise a turbo-encoder with code rates ⅕. The output of the block 504(2) comprises code symbols. The code symbols are interleaved by a block 504(4). The block 504(4) may comprise a bit-reversal channel interleaver. Depending on the data rate and encoder code rate, the sequence of interleaved code symbols is repeated in block 504(6) as many times as necessary to achieve a fixed modulation symbol rate, and provided to a block 504(8). Block 504(8) passes the symbols to a block 504(10), which maps the binary symbols onto modulation symbols in accordance with the selected modulation. The mapped symbols are then provided to a block 504(12), which covers each symbol with a Walsh code generated by block 504(14), and the resulting chips are provided for further processing, described in details below.

As part of the processing, the code symbols are transformed into modulation symbols. The TDM traffic channel modulation symbols are then time division multiplexed with the and the chips of the RRI channel. However, the size of the TDM channel does not necessarily match the size of the symbols resulting by combining the RRI channel chips and the TDM traffic channel modulation symbols representing a packet. Consequently, the chips representing the original packet symbols are divided into sub-packets, which are inserted into the TDM channel and transmitted. The method for transmission, an incremental redundancy, is described in a co-pending U.S. patent application Ser. No. 09/863,196, entitled "ENHANCED CHANNEL INTERLEAVING FOR INCREASED DATA THROUGHPUT", filed May 22, 2001, assigned to the present assignee.

The above-described sub-packet transmission is described in reference to Table 3, which illustrates the packet parameters. The rates of data and associated packet parameters are given as a means of an example, consequently, other rates of data and associated packet parameters are contemplated.

TABLE 3

| Data Rate (kbps) | Data Bits | Code Symbols | Mod Type | Mod Symbols | RRI chips | Mod Symbols in a TDM channel |
| --- | --- | --- | --- | --- | --- | --- |
| 76.8 | 256 | 1280 | QPSK | 640 | 384 | 1280 |
| 153.6 | 512 | 2560 | QPSK | 1280 | 192 | 1664 |
| 230.4 | 768 | 3840 | QPSK | 1792 | 128 | 1792 |
| 307.2 | 1024 | 5120 | QPSK | 1856 | 96 | 1856 |
| 460.8 | 1536 | 7680 | QPSK | 1920 | 64 | 1920 |
| 614.4 | 2048 | 10240 | QPSK | 2560 | 64 | 1920 |
| 921.6 | 3072 | 15360 | 8-PSK | 3840 | 64 | 1920 |
| 1228.8 | 4096 | 20480 | 8-PSK | 5120 | 64 | 1920 |
| 1843.2 | 6144 | 30720 | 16-QAM | 7680 | 64 | 1920 |

Considering an rate of data of 1843.2 kbps, the data to be transmitted are divided into blocks of size of 6144 bits. Encoded by a code rate of ⅕ results into 6144×5=30720 code symbols. The modulation is 16-QAM, which means that each four code symbols result in one modulation symbols. So the 30720 code symbols result in 30720/4=7680 modulation symbols. Because the TDM channel comprises two half-time-slots, the TDM channel size is 1024 per slot. Because the number of RRI chips in a time-slot is 64, there is space for 2×(1024−64)=1920 modulation symbols in a TDM channel.

The first sub-packet is formed by inserting the first 1920 modulations symbols from the total 7680 modulation symbols into the a TDM channel. Because the sub-packet contains all the information necessary for recovery of the data bits of the packet, if the transmission is successful, i.e., the sub-packet decodes; the next packet is transmitted. If the transmission fails, the next sub-packet is formed. In one embodiment, the next sub-packet is formed by inserting the second 1920 modulations symbols from the total 7680 modulation symbols into the a TDM channel. This method is repeated until the data bits of the packet are successfully decoded, or a pre-determined number of sub-packets transmission or re-transmissions is reached.

To enable the access point soft-combine the sub-packets, transmitted by this incremental redundancy (HARQ) method, each sub-packet is assigned a sub-packet index. The sub-packed index is transmitted on a TDM Reverse Rate Indication Channel as described below.

The term sub-packet was used in the previous description for tutorial purposes, namely, to explain the concept of incremental redundancy. Because such differentiation is mainly semantic, the term packet will be used collectively, unless necessary for clear understanding.

TDM Reverse Rate Indication Channel

The TDM RRI channel 422(RRI) serves a similar purpose as the CDM RRI. Consequently, the TDM RRI channel provides an indication of a reverse link packet type, e.g., (payload size, code rate, modulation, and the like), as well as a sub-packet index, which is used for the incremental redundancy (HARQ).

To provide the required indication, the RRI comprises 5 bits of information. Referring to FIG. 5, the RRI value is provided to a block 502(2), which bi-orthogonally encodes the 5-bits to provide a codeword. The codeword is provided to a block 502(4), which repeats each of the codeword. The repeated codeword is provided to a block 502(6), which maps the binary symbols onto modulation symbols in accordance with the selected modulation. The mapped symbols are further provided to a block 502(8), which covers each symbol with a Walsh code generated by block 502(10), and the resulting chips are provided for further processing, described in details below.

Table 4 summarizes the RRI codeword values.

TABLE 4

| RRI Codeword Value | Packet Rate | Sub-packet Index |
| --- | --- | --- |
| 0, 1 | 76.8k | 1, 2 |
| 2, 3 | 153.6k | 1, 2 |
| 4, 5 | 230.4k | 1, 2 |
| 6, 7 | 307.2k | 1, 2 |
| 8, 9 | 460.8k | 1, 2 |
| 10, 11, 12 | 614.4k | 1, 2, 3 |
| 13, 14, 15 | 921.6k | 1, 2, 3 |
| 16, 17, 18, 19 | 1228.8k | 1, 2, 3, 4 |
| 20, 21, 22, 23 | 1843.2k | 1, 2, 3, 4 |

Referring to Table 4, when the access point receives and decodes RRI codeword with value '0', the access point attempts to decode the sub-packet with a rate of data 76.8 kbps. If the sub-packet fails to decode, the access point receives next packet and decodes RRI codeword with value '1', the access point may combine the current sub-packet with the previously received sub-packet, because the RRI codeword with value '1' identifies the currently received sub-packet with index '2', which may be combined with sub-packet with index '1'.

As discussed above, a pilot channel is a reference signal, i.e., parameters of the pilot signal, e.g., structure, transmission power, and other parameters are known at the access point. Upon receiving the pilot channel, the access point determines the parameters of the reverse pilot signal as affected by the communication link. By relating the two sets of parameters, i.e., the parameters upon transmission and the parameters as received, the access point may estimate the communication link and coherently demodulate the communication link's channels. Methods of using a reference signal for estimating communication link are known in the art. For reference see e.g., a co-pending U.S. patent application Ser. No. 09/943,277, entitled "METHOD AND APPARATUS FOR MULTI-PATH ELIMINATION IN A WIRELESS COMMUNICATION SYSTEM", filed Aug. 30, 2001, assigned to the present assignee.

Referring to FIG. 4a-b, the reverse pilot channel, used for estimation of the reverse link and coherent demodulation of the channels transmitted in the first half-time-slot is not available in the second half-time-slot. However, the relatively high transmission power and elaborate encoding assures that the probability of reception and correct decoding of the RRI channel is high. Furthermore, both the access terminal and the access point are provided by the information summarized in Table 4.

Therefore, the access point may construct hypothesis of what rate of data and what RRI codeword was transmitted, and attempts to decode the RRI by trying the hypothesis. The access selects the hypothesis, which is most likely in accordance to the metric used for the hypothesis testing. As discussed below, reverse pilot channel is transmitted with a power determined by the power control loops so that the reverse pilot channel from all access terminals is received at the access point with the same power ($P_{Pilot}$). Because the RRI channel power ($P_r$) is related to the reverse link transmission power (see Equation (3) below), once the RRI channel is correctly decoded, the access point may use Equation (3) to determine the parameters of the RRI channel necessary for estimating the reverse link channel quality. Consequently, the RRI channel may be used as a reference signal in lieu of the pilot channel for estimation of a reverse link channel quality and coherent demodulation of the channels transmitted in the second half-time-slot.

To properly use Equation (3) the access point needs to know the value of A, a rise over thermal (ROT) differential between the overhead and traffic transmission intervals. As further discussed below, the access point measures the value of A.

Although the CDM Traffic Channel/CDM RRI channel were described as using the same structure generating the TDM Traffic channel and the TDM RRI Channel, this need not be the case, there may be separate structures for the CDM Traffic Channel, CDM RRI channel and TDM Traffic channel and the TDM RRI Channel.

OFDM Reverse Traffic channel

As discussed, transmission of a rate of data depends on characteristics of a communication channel, e.g. a signal-to-interference-and-noise-ratio (SINR); higher rates of data requiring higher SINR. Because multipath interference is a significant contributor to interference-and-noise, mitigation of interference at higher rates of data would significantly improve performance of the communication system.

Figure 6A:
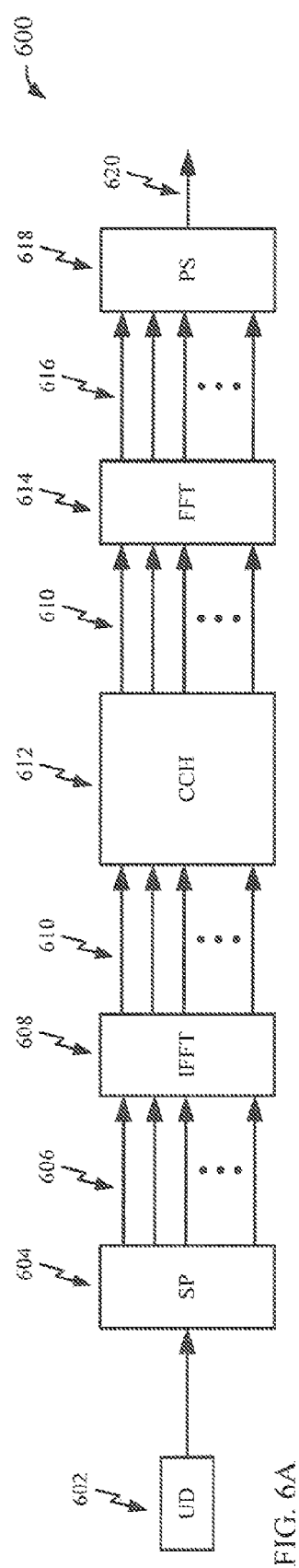
FIGS. 6a-c illustrate conceptual block diagram of an OFDM communication system.

One means for multipath interference mitigation is Orthogonal Frequency Division Modulation (OFDM). OFDM is known modulation method, fundamentals of which are explained in reference to FIG. 6. An OFDM communication system 600 takes a user data 602 and provides them to block 604. (The pre-processing of user data before block 604, i.e., encoding, repeating, interleaving, and the like, are not shown for brevity purposes.) Block 604 distributes the user data among many parallel bins 606, the exact number being a function of the used Fast Fourier Transform (FFT) size. The parallel bins 606 are modulated in block 608 by an inverse FFT (IFFT). This modulated signal, comprising a bank of signals whose number is equal to the number of parallel bins, is then upconverted to a set of radio frequency sub-carriers 610, amplified and transited over a communication channel 612. The signal is received and demodulated in block 614 using the FFT. The demodulated data 616 are then re-distributed by block 618 to user data 620.

The user data are protected from multipath-induced frequency selective fading. If a sub-carrier experiences a fade, the user data lost are only a small portion of the aggregate user data. Because the transmitted user data contain error correction bits, the missing pieces may subsequently be recovered.

The above-described OFDM may be utilized for transmission in the second half of the TDM interval as follows. When the access terminal determines that a rate of user data to be transmitted over the reverse link is above a pre-determined rate of data, e.g., above 614.4 kbps, the access terminal transmits the user data utilizing the OFDM instead of the TDM.

OFDM Reverse Rate Indicator Channel

To provide the required indication, the OFDM RRI may comprise 5 bits of information. The RRI vale 602(2) is provided separately from user data 602(1) to a block 604 (of FIG. 6A), which distributes the RRI data to at least one pre-determined parallel bin 606(2), and which distributes the user data on the remaining parallel bins 606(1). (The pre-processing of user data and RRI date before block 604, i.e., encoding, repeating, interleaving, and the like, are not shown for brevity purposes.) Further processing proceeds as described in FIG. 6. Referring back to FIG. 6a, upon reception, the signal is received and demodulated in block 614 using the FFT. The demodulated RRI data 616(2) and the demodulated user data 616(2) are then re-distributed by block 618 to provide user 620(1) and RRI value 620(2).

Figure 6B:
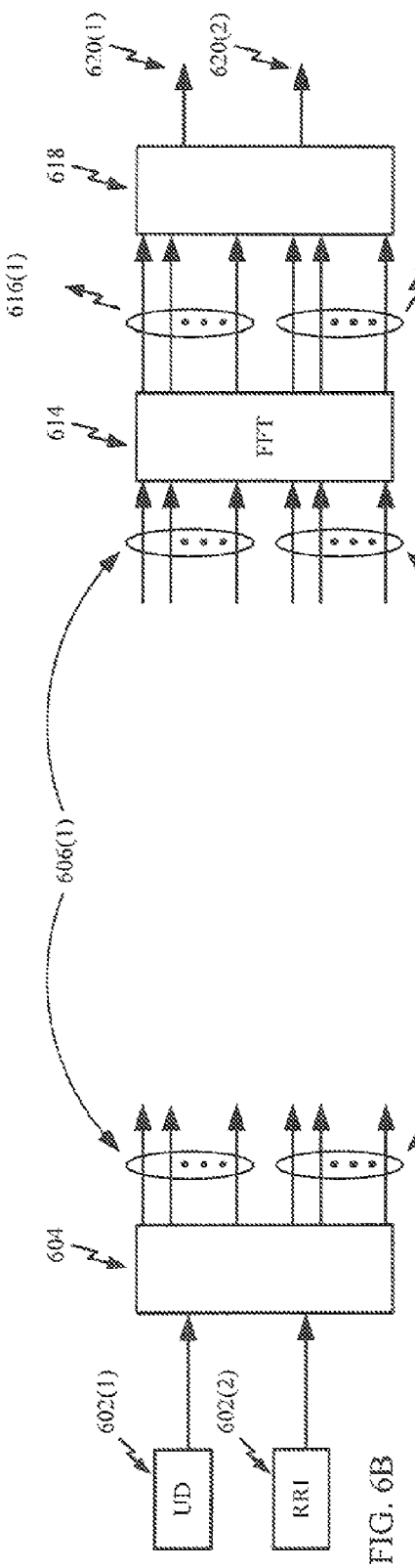
Figure 6C:
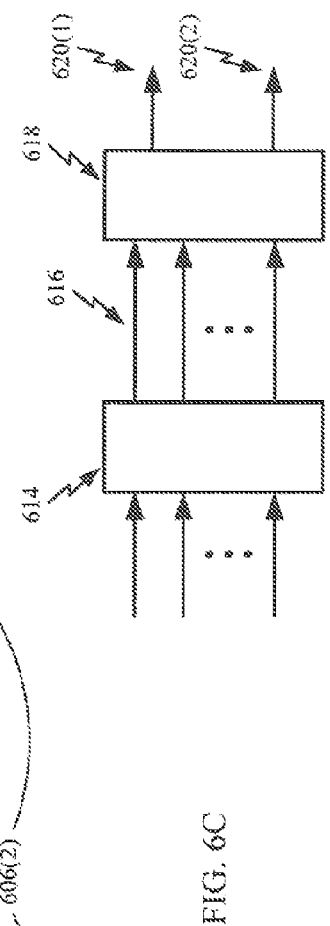

Alternatively, the user data and the RRI data are multiplexed and provided to the block 604 (of FIG. 6). (The pre-processing of user data before block 604, i.e., encoding, repeating, interleaving, and the like, are not shown for brevity purposes.) Consequently, the RRI values, as well as the user data are distributed among the parallel bins 606. Further processing proceeds as described in FIG. 6. Referring to FIG. 6c, upon reception, the signal is received and demodulated in block 614 using the FFT. The demodulated RRI data and the demodulated user data 616 are then re-distributed by block 618 to provide user 620(1) and RRI value 620(2).

Reverse Link Architecture

FIG. 5c further illustrates the reverse link channels' architecture. The TDM Traffic Channel 422(T), and the TDM RRI channel 422(RRI) (of FIG. 4) are time division multiplexed in block 514, and provided to gain adjustment block 516(1). After the gain adjustment, the time division multiplexed signal is provided to a modulator 518.

The Pilot Channel 412, the Data Request channel 4414, the Acknowledgement channel 416, the Packet Request channel 418 (of FIG. 4), are provided to the respective gain adjustment blocks 516(2)-516(5). After the gain adjustment, the respective channels are provided to the modulator 518.

Additionally, the optional CDM traffic channel/CDM RRI channel 420 (of FIG. 4) are provided to a gain adjustment blocks 516(7). After the gain adjustment, the respective channels are provided to the modulator 518.

The modulator 518 combines the incoming channel signals, and modulates the combined channel signals in accordance with an appropriate modulation method, e.g., a binary phase-shift keying (BPSK), a quadrature phase-shift keying (QPSK), quadrature amplitude modulation (QAM), 8-phase-shift keying (8-PSK), and other modulation methods known to one of ordinary skill in the art. The appropriate modulation method may change in accordance with a rate of data to be transmitted, channel condition, and/or other design parameter of the communication system. The combining of the incoming channel signals will change accordingly. For example, when a selected modulation method is QPSK, the incoming channel signals will be combined onto an In-phase and Quadrature signals, and these signals will be are quadrature spread. The selection of channel signals are combined on the In-phase and Quadrature signals in accordance with design parameter of the communication system, for example distributing the channels so that the data load between the In-phase and Quadrature signals is balanced, the resulting waveform peak-to-average is lowered, and other design parameters.

The modulated signal is the filtered in block 520, upconverted to a carrier frequency in block 522, and provided for transmission.

Reverse Link Access Method

As discussed, the reverse link user data transmissions from the legacy access terminals utilize a code-division multiplex, e.g., the CDMA in accordance with the IS-856 standard. In accordance with the IS-856 standard, the access terminals may access the carrier frequency of the reverse link, therefore, initiate reverse link transmission autonomously, disregarding any potential reverse link distribution between TDMA and CDMA intervals. The initial reverse link transmission occurs at a pre-determined rate of data, e.g., 9.6 kbps. When a reverse activity bit (RAB) received over a Reverse Activity Channel is zero, the access terminal may increase rate to the next higher rate with probability p; when the RAB is one, the access terminal may decrease rate to the next lower rate with probability q. The probabilities p and q for each rate are either transmitted from an access network to an access terminal or are negotiated between an access point and access terminal, e.g., upon connection.

Consequently, the new access terminals utilizing a code-division multiplex, e.g., the CDMA in accordance with the IS-856 standard may initiate reverse link transmission autonomously, disregarding any potential reverse link distribution between TDMA and CDMA intervals, as described above.

The new access terminals utilizing a CDMA designated interval modulation may initiate reverse link transmission in the CDMA designated interval autonomously as described above.

The reverse link transmissions from the new access terminals utilizing a TDMA designated interval occur from at least one of the access terminals in a portion of a reverse link interval. To illustrate how the one time-slot interval structure described above may be extended to a multi time-slot interval, the reverse link data transmission as described below uses an interval equal to two time-slots. However, as mentioned above, any number of time-slots may be used to construct the interval. The access to the carrier frequency of the reverse link for the new access terminals utilizing the TDMA designated interval depends on the mode of data multiplexing.

Those of the new access terminals utilizing the CDM only mode, i.e., transmitting user data using only CDM in the TDMA interval may access the carrier frequency of the reverse link, therefore, initiate reverse link transmission autonomously, as described above.

In contrast, access to the carrier frequency of the reverse link, therefore, the reverse link transmission for the new access terminals utilizing a TDM/OFDM or a CDM and TDM/OFDM mode, i.e., transmitting user data using TDM/OFDM or a CDM and TDM/OFDM in the TDMA interval is scheduled by an entity in an access network in response to the access terminals' request to convey the user data. The access terminal is scheduled in accordance with the quality metric of the access terminal's channel in the interval on the reverse link, the access terminal's average reverse link quality metric, and an impatience function. If a new access terminal is not scheduled, i.e., the access terminal is denied a permission to transmit; the access terminal must suppress transmission in at least the TDM/OFDM portion of the interval. Thus, the access terminals either transmit no data in the interval or transmit data only in the CDM portion of the interval, i.e., utilizing the CDM portion of the TDMA interval.

Figure 7:
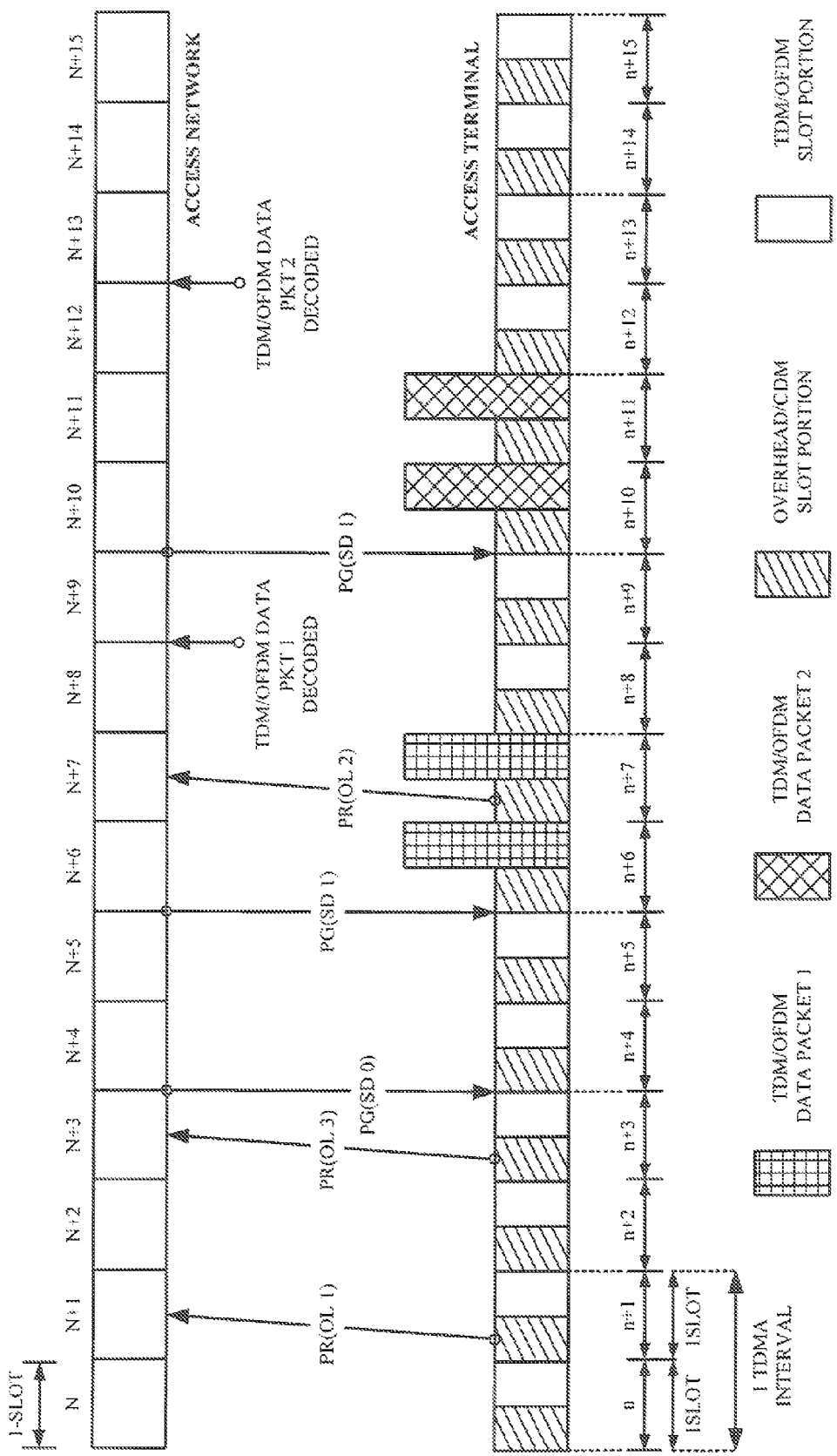
FIG. 7 illustrates an embodiment of a reverse link data transmission.

One example of the reverse link data transmission for an access terminal requesting TDMA is shown, and will be explained with reference to FIG. 7. FIG. 7 illustrates reverse link data transmission negotiation for one access terminal, for the sake of understanding only. Furthermore, only the serving access point is shown. However, it is understood that, as described above, the concept may be extended to multiple access terminals. Additionally, multiple access points of the access network may receive and decode the reverse link from the transmitting access terminal and provide information whether or not the user data were successfully decoded to the serving access point. Alternatively, the access points that received the payload information send the payload information to centralized entity to perform soft-decision decoding. The central decoder then notifies the serving access point whether the payload decoding was successful. The serving access point indicates an ACK over the PG channel, thus preventing unnecessary re-transmission.

Because the access procedure, serving sector selection, and other call setup procedures are based on the like functions of the communication system in accordance with the IS-856 standard as described above, they are not repeated. The only difference is that the new access terminals do not transmit the access channel probes during the TDM/OFDM half-time-slot.

The access terminal (not shown) having received data to be transmitted and wishing to transmit in the TDMA interval, evaluates the access terminal's reverse link quality metric and impatience function for the TDMA interval, and generates an opportunity level (OL 1). For the sake of understanding only, it is assumed that all intervals are designated as TDMA. The Access Terminal estimates the data rate at which it can transmit and generates the data type accordingly. As discussed, the packet data type not only indicates the date rate but also designates the packet as original or retransmitted. As described in more detail below, the rate determination method determines maximum supportable rate in accordance with an amount of data to be transmitted, the access terminal's maximum transmit power and transmit power allocated to a pilot channel. The access terminal then determines, whether rules for transmitting a next value in packet ready channel are satisfied. The rules may comprise:

a next value in a packet ready channel is transmitted over an interval, e.g., two time-slots;

a next value in the packet ready channel is transmitted upon change in the opportunity level;

a next value in the packet ready channel is transmitted even if the opportunity level does not change if no packet grant has been received for a pre-determined time interval; and no packet ready channel is transmitted if the access terminal has no data to transmit When the rules are satisfied, the access terminal communicates the requested data rate and the opportunity level over the PR channel over the time-slots n and n+1.

A serving access point (not shown) of the access network receives the reverse link and decodes the information contained in time-slots n and n+1 in slot N+1. The serving access point then provides the opportunity level, the packet data type, and the requested data rate of all access terminals requesting permission to transmit data to a scheduler (not shown). The scheduler schedules packets for transmissions in accordance with scheduling rules. As discussed, the scheduling rules attempt to minimize mutual reverse link interference among access terminals while achieving the required QoS or data distribution fairness. The rules are as follows:

i. precedence to transmit is given to the access terminal reporting the highest opportunity level;

ii. in the event that several access terminals report identical opportunity level, precedence is given to the access terminal with lower transmitted throughput;

iii. in the event that several access terminals satisfy rules (i) and (ii) the access terminal is selected at random; and iv. a permission to transmit is given to one of the access terminals with data available for transmission even if the reported opportunity level is low in order to maximize reverse link utilization.

After having made scheduling decision, the serving access point transmits the scheduling decision for each of the access terminals requesting permission to transmit on the PG channel. As illustrated, the serving access point sent a scheduling decision (SD 0), denying the access terminal permission to transmit a new packet in slots N+2 and N+3.

Because the access terminal did not receive any response to the PR channel, and the access terminal has data to be transmitted, the access terminal again evaluates the access terminal's reverse link quality metric and impatience function, which this time results in an increased opportunity level (OL 3). The access terminal further generates the packet data type and estimates the data rate, and provides the packet data type and the requested data rate over a RRI channel, and the opportunity level over the PR channel of the reverse link in time-slots n+2 and n+3.

The serving access point receives the reverse link and decodes the information contained in time-slots n+2 and n+3 in slot N+3. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. As shown the serving access point transmits a scheduling decision (SD 1) permitting new packet transmission in time-slots N+4 and N+5.

The access terminal receives the PG channel and decodes the scheduling decision (SD 0) transmitted in time-slots N+2 and N+3 in time-slot n+3. The Access Terminal therefore abstains from transmitting during time-slots n+4 and n+5. The access terminal has data to be transmitted, consequently, the access terminal evaluates the access terminal's reverse link quality metric and impatience function. As illustrated, the access terminal determined an opportunity level (OL 3), which is the same as in the two slots prior to this transmission, consequently, the access terminal abstains from transmitting PR channel in time-slot n+4 and n+5.

The serving access point makes a scheduling decision (SD 1) to allow the access terminal to transmit, consequently, the serving access point transmits the scheduling decision for each of the access terminals requesting permission to transmit on the PG channel. As shown, the serving access point transmits a scheduling decision (SD 1) permitting new packet transmission in time-slots N+4 and N+5

The access terminal receives the PG channel and decodes the scheduling decision (SD 1) transmitted in time-slots N+4 and N+5 in time-slot n+5. In addition to the data transmitted in slots n+6 and n+7, the access terminal has data to be transmitted, consequently, the access terminal evaluates the access terminal's reverse link quality metric and impatience function. As illustrated, the access terminal determined an opportunity level (OL 2), consequently, the access terminal transmits PR channel in time-slot n+6 and n+7. Because the access terminal was permitted to transmit, the access terminal further transmits the user data in the TDM/OFDM portions of the reverse link traffic channel in the time-slots n+6 and n+7.

As illustrated in FIG. 7, the access terminal received the permission to transmit after two requests. Each of the packet requests may have been associated with the same packet or with different packets. If each of the packet requests have been associated with different packets, in one embodiment, the access terminal autonomously decides, which packet to sent. Alternatively, the permission to transmit is associated with the first non-granted packet requests. However, other strategies are fully within the scope of the invention.

The serving access point receives the reverse link and decodes the PR channel information contained in time-slots n+6 and n+7 in slot N+7, and the user data contained in time-slots n+6 and n+7 in time-slots N+8 and N+9. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. Because the access point successfully decoded the user data, the serving access point transmits a scheduling decision (SD 1) permitting new packet transmission in time-slots N+10 and N+11.

The access terminal did not send a PR in time-slots n+8 and n+9 nor in time-slots n+10 and n+11 because, upon the access terminal's evaluation of reverse link quality metric and impatience function, rules for transmitting a next value in packet ready channel were not satisfied.

The access terminal receives the PG channel and decodes the scheduling decision SD 1 in slot n+11. Because the access terminal was permitted to transmit, the access terminal further transmits the user data in the TDM/OFDM portions of the opportune time-slots n+12 and n+13.

The serving access point receives the reverse link and decodes the user data contained in time-slots n+12 and n+13 in time-slots N+14 and N+15. Because the access point successfully decoded the user data, but the serving access point has no outstanding packet request, the access point does not transmit a PG.

Figure 8:
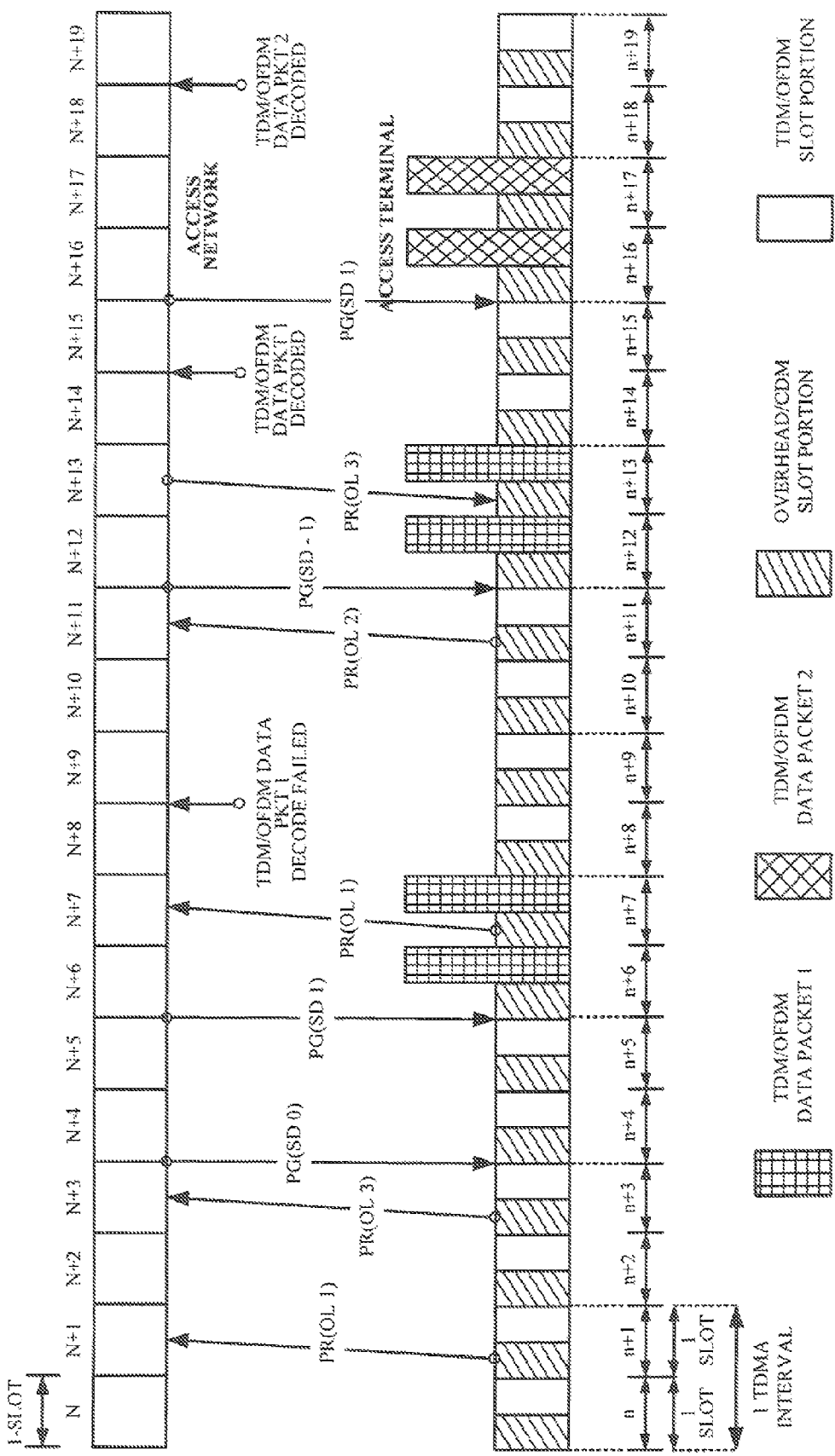
FIG. 8 illustrates an embodiment of a reverse link data re-transmission.

The case for the access network failing to correctly decode the payload send over the reverse link in slot n+6 and n+7 is illustrated in FIG. 8.

The serving access point receives the reverse link and decodes the PR channel information contained in time-slots n+6 and n+7 in slot N+7, and the user data contained in time-slots n+6 and n+7 in time-slots N+8 and N+9. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. Because the access point failed to successfully decode the user data, the serving access point transmits a scheduling decision (SD−1) permitting previously transmitted packet re-transmission in time-slots N+10 and N+11.

The access terminal did not send a PR in time-slots n+8 and n+9 because, upon the access terminal's evaluation of reverse link quality metric and impatience function, rules for transmitting a next value in packet ready channel were not satisfied. However, access terminal sent a PR in time-slots n+10 and n+11 because upon the access terminal's evaluation of reverse link quality metric and impatience function, the opportunity level has changed.

The access terminal receives the PG channel and decodes the scheduling decision SD−1 sent in time-slots N+10 and N+11 in time-slot n+11. Because the access terminal was permitted to re-transmit the previously transmitted packet and not the new packet, the access terminal has data to be transmitted, consequently, the access terminal evaluates the access terminal's reverse link quality metric and impatience function. As illustrated, the access terminal determined an opportunity level (OL 3), consequently, the access terminal transmit PR channel in time-slot n+12 and n+13. Furthermore, the access terminal re-transmits the user data in the TDM/OFDM portions of the opportune time-slots n+12 and n+13.

The serving access point receives the reverse link and decodes the PR channel information contained in time-slots n+12 and n+13 in slot N+13, and the user data contained in time-slots n+12 and n+13 in time-slots N+14 and N+15. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. Because the access point successfully decoded the user data, the serving access point transmits a scheduling decision (SD 1) permitting new packet transmission in time-slots N+14 and N+15.

The access terminal receives the PG channel and decodes the scheduling decision SD 1 in slot n+15. Because the access terminal was permitted to transmit, the access terminal further transmits the user data in the TDM/OFDM portions of the opportune time-slots n+16 and n+17.

The serving access point receives the reverse link and decodes the user data contained in time-slots n+16 and n+18 in time-slots N+18 and N+19. Because the access point successfully decoded the user data, but the serving access point has no outstanding packet request, the access point does not transmit a PG.

It will be appreciated that the serving access point may schedule an access terminal in accordance with their latest received request for transmission.

It will be appreciated that the access network may fail to receive PR channel. Since the access terminal does not re-transmit the PR channel until an opportunity level changes, to prevent the failure in communication, the access terminal re-transmits the PR channel after a pre-determined amount of time.

It will be appreciated that the packet access network may fail to receive packet even upon several re-transmission attempts. To prevent excessive re-transmission attempts, the communication system may give up re-transmission attempts after a determined number of re-transmission attempts (persistence interval). The missing packet is then handled by a different method, e.g., a radio link protocol (RLP).

Reverse Link Power Control

As discussed, at least one access terminal in a sector is transmitting data traffic on the reverse link using TDMA. Because in the CDMA communication system all terminals are transmitting on the same frequency, each transmitting access terminal acts as a source of interference to the access terminals in adjacent sectors. To minimize such an interference on the reverse link and maximize capacity, the transmit power of the pilot channel for each access terminal is controlled by two power control loops. The transmit power of the remaining overhead channels and the CDM traffic channel is then determined as a fraction of the transmit power of the pilot channel. The transmit power of the TDM traffic channel is determined as a traffic-to-pilot power ratio for a given data rate, corrected by a rise over thermal differential between the overhead and traffic transmission intervals. Rise over thermal is a difference between a receiver noise floor and a total received power as measured by the access terminal.

Pilot Channel Power Control

The pilot channel power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein. Other power control methods are also contemplated and are within the scope of the present invention.

The first power control loop (outer loop), adjusts a set point so that a desired level of performance, as evaluated at the sector receiving the reverse link with the best quality metric, is maintained. The level of performance comprises e.g., a DRC channel erasure rate and CDM Traffic channel packet error rate (PER). The set point is updated in accordance with rules that may be as follows:

set point is decreased if DRC erasure rate is less than a threshold, e.g., 25%, and a CDM packet was decoded successfully, provided that the CDM-RRI was successfully detected;

set point is increased if DRC erasure rate is greater than the threshold or CDM packet was not successfully decoded, provided that the CDM RRI was successfully detected.

The set point is updated periodically every pre-determined number of frames following selection diversity at the access points. The DRC erasure rate is measured over that interval. If no CDM traffic channel is received within the update interval, the set point is updated in accordance with the DRC erasure rate only. If the pre-determined number of frames is greater than one frame, set point is updated at either the update interval or failure to successfully decoded CDM packet, provided that the CDM RRI was successfully detected.

The second power control loop (inner loop) adjusts the transmit power of the access terminal so that the reverse link quality metric is maintained at the set point. The quality metric comprises an energy-per-chip-to-noise-plus-interference ratio (Ecp/Nt), and is measured at the access point receiving the reverse link. Consequently, the set point is also measured in Ecp/Nt. The access point compares the measured Ecp/Nt with the power control set point. If the measured Ecp/Nt is greater than the set point, the access point transmits a power control message to the access terminal to decrease the access terminal's transmit power. Alternatively, if the measured Ecp/Nt is below the set point, the access point transmits a power control message to the access terminal to increase the access terminal's transmit power. The power control message is implemented with one power control bit. A first value for the power control bit ("up") commands the access terminal to increase the access terminal's transmit power and a low value ("down") commands access terminal to decrease the access terminal's transmit power. The access terminal receiving the power control bits from multiple sectors decreases transmit power if one of the power control commands is "down," and increases transmit power otherwise.

The power control bits for all access terminals in communication with each access point are transmitted on the MAC channels of the forward link.

Remaining Overhead Channels and CDM Traffic Channel Power Control

Once the transmit power of the pilot channel for a time-slot is determined by the operation of the power control loops, the transmit power of each of the remaining overhead channels and the CDM traffic channel are determined as a ratio of the transmit power of the specific overhead and CDM channel to the transmit power of the pilot channel. The ratios for each overhead and CDM channel are determined in accordance with simulations, laboratory experiments, field trials and other engineering methods known to one of ordinary skills in the art.

Thus for example the power of the CDM Traffic Channel/RRI Channel relative to that of the Pilot Channel for the Reverse Traffic Channel depends on the data rate as shown in Table 5.

TABLE 5

| Data Rate (kbps) | Data Channel Gain Relative to Pilot (dB) |
| --- | --- |
| 0 | -∞ (Data Channel Is Not Transmitted) |
| 9.6 | DataOffsetNom + DataOffset9k6 + 3.75 |
| 19.2 | DataOffsetNom + DataOffset19k2 + 6.75 |
| 38.4 | DataOffsetNom + DataOffset38k4 + 9.75 |
| 76.8 | DataOffsetNom + DataOffset76k8 + 13.25 |
| 153.6 | DataOffsetNom + DataOffset153k6 + 18.5 |

TDM Traffic Channel Power Control

The required transmit power of the traffic channel is also determined in accordance with the transmit power of the pilot channel. In one embodiment, the required traffic channel power is computed using the following formula:

$$P_t = P_{pilot} \cdot G(r) \cdot A. \tag{3}$$

where:

$P_t$ is the transmit power of the traffic channel;

$P_{pilot}$ is the transmit power of the pilot channel;

$G(r)$ is a traffic-to-pilot transmit power ratio for a given data rate r, and

A is an estimated rise over thermal (ROT) differential between the overhead and traffic transmission intervals. The term "rise over thermal" is used herein to mean a difference between a noise floor and a total received power as measured by the access terminal.

The measurement of the ROT in the overhead transmission interval (ROToverhead) and the traffic (ROTtraffic) transmission interval, needed for calculation of A at the access point is well known in the art. Such a measurement is described in disclosed in U.S. Pat. No. 6,192,249 entitled "Method and apparatus for reverse link loading estimation", assigned to the assignee of the present invention. Once the noise in both the overhead and traffic transmission intervals are measured, the A is computed using the following formula:

$$A = \text{ROT}_{traffic} - \text{ROT}_{overheadt} \quad (4)$$

The computed value of A is then transmitted to the access point, e.g. over the legacy RA channel if only access terminals operating using TDMA are present in the communication system or over the new RA channel if both legacy and new access terminals are operating in the communication system.

Alternatively, the value of A represents an estimate of the ROT differential given by Equation (3). An initial value of A is determined in accordance with in accordance with simulations, laboratory experiments, field trials and other engineering methods known to one of ordinary skills in the art. The value of A is then adjusted in accordance with the reverse link packet error rate (PER) so that a determined PER is maintained in a maximum allowed number of transmissions of a given packet. The reverse link packet error rate is determined in accordance with ACK/NACK of the reverse link packets as described above. In one embodiment, the value of A is increased by a first determined amount if an ACK has been received within N re-transmission attempts of the maximum M re-transmission attempts. Similarly, the value of A is decreased by a second determined amount if an ACK has not been received within N re-transmission attempts of the maximum M re-transmission attempts.

From Equation (3) follows that the traffic channel transmit power is a function of the data rate r. Additionally, an access terminal is constrained in maximum amount of transmit power ($P_{max}$). Therefore, the access terminal initially determines how much power is available from the $P_{max}$ and the determined $P_{pilot}$. The access terminal then determines the amount of data to be transmitted, and selects the data rate r in accordance with the available power and the amount of data. The access terminal then evaluates Equation (3) to determine, whether the effect of the estimated noise differential A did not result in exceeding the maximum available power. If the maximum available transmit power is exceeded, the access terminal decreases the data rate r and repeats the process.

The access point can control the maximum data rate that an access terminal can transmit by providing the access terminal with a maximum allowed value G(r)·A via the legacy RA channel if only access terminals operating in TDMA are present in the communication system or over the new RA channel if both legacy and new access terminals are operating in the communication system.

Alternatively, the AT determines the value of G(r)·A in accordance with traffic-to-pilot power ratio and the estimate of A adjusted in accordance with the reverse link packet error rate (PER) determined in accordance with ACK/NACK as described above.

Packet Decoding Modification

The above-introduced traffic-to-pilot transmit power ratio G(r) for a given data rate r is determined by taking into account number of (re)transmissions of a packet for correct packet decoding. Therefore, if the packet is to be correctly decoded with one transmission, the traffic-to-pilot transmit power ratio is greater than the traffic-to-pilot transmit power ratio if one or more transmissions are allowed.

The number of (re)transmissions determines latency, which affects a quality of service (QoS). Because different types of packets, e.g., voice packet, file transfer protocol packet, and the like, require a different QoS, the different types of packets may be assigned different traffic-to-pilot transmit power ratios. Thus, for example, when an access terminal determines that a voice packet, requiring a certain QoS (low latency), is to be transmitted, the access terminal utilizes a first traffic-to-pilot transmit power ratio, which is greater than a second traffic-to-pilot transmit power ratio utilized when an FTP packet, requiring a different QoS (high latency) is to be transmitted.

RRI Channel Power Control

As discussed above, the RRI channel is time-division-multiplexed with the traffic channel payload. To avoid the need to transmit the RRI portion of the traffic/RRI channel time-slot at a different power level than the traffic portion, the power distribution between the RRI channel and the traffic channel is controlled by the number of chips allocated to the RRI channel as a function of the transmitted data rate.

To ensure correct decoding of a determined number of chips comprising a Walsh covered codeword, a required power can be determined. Alternatively, if the power for traffic/payload necessary for a transmission is known, and the RRI portion of the traffic/RRI channel time-slot is transmitted at the same power, the number of chips adequate for reliable RRI channel decoding can be determined. Consequently, once the data rate and, therefore, the power for transmission of the traffic/RRI channel time-slot is determined, so is the number of chips allocated to the RRI channel. The access terminal generates the five-bit packet type, bi-orthogonally encodes the five bits to obtain symbols, and fills the number of chips allocated to the RRI channel with the symbols. If the number of chips allocated to the RRI channel is greater than the number of symbols, the symbols are repeated until all the chips allocated to the RRI channel are filled.

AT and AP Structures

Figure 9:
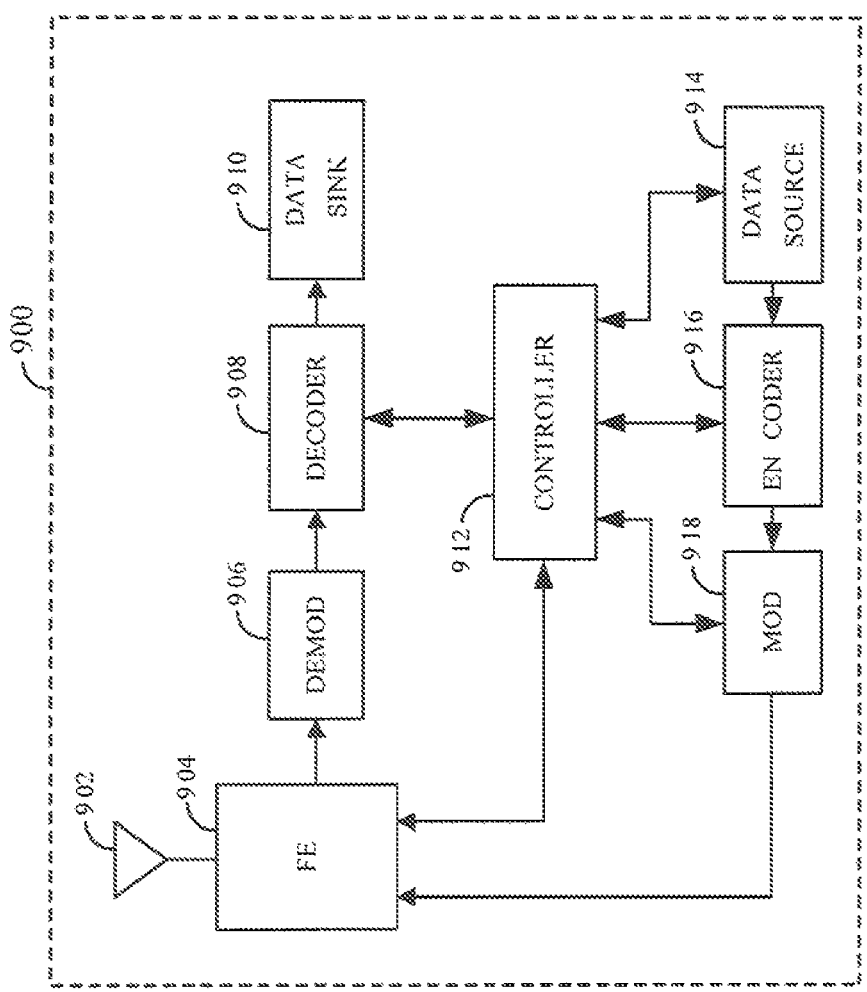
FIG. 9 illustrates access terminal.

Access terminal 900 is illustrated in FIG. 9. Forward link signals are received by antenna 902 and routed to a front end 904 comprising a receiver. The receiver filters, amplifies, demodulates, and digitizes the signal provided by the antenna 902. The digitized signal is provided to demodulator (DEMOD) 906, which provides demodulated data to decoder 908. Decoder 908, performs the inverse of the signal processing functions done at an access terminal, and provides decoded user data to data sink 910. The decoder further communicates with a controller 912, providing to the controller 912 overhead data. The controller 912 further communicates with other blocks comprising the access terminal 900 to provide proper control of the operation of the access terminal's 900, e.g., data encoding, power control. Controller 912 can comprise, e.g., a processor and a storage medium coupled to the processor and containing a set of instructions executable the processor.

The user data to be transmitted to the access terminal are provided by a data source 914 by direction of the controller 912 to an encoder 916. The encoder 916 is further provided with overhead data by the controller 912. The encoder 916 encodes the data and provides the encoded data to a modulator (MOD) 918. The data processing in the encoder 916 and the modulator 918 is carried out in accordance with reverse link generation as described in the text and figures above. The processed data is then provided to a transmitter within the front end 904. The transmitter modulates, filters, amplifies, and transmits the reverse link signal over the air, through antenna 902, on reverse link.

Figure 10:
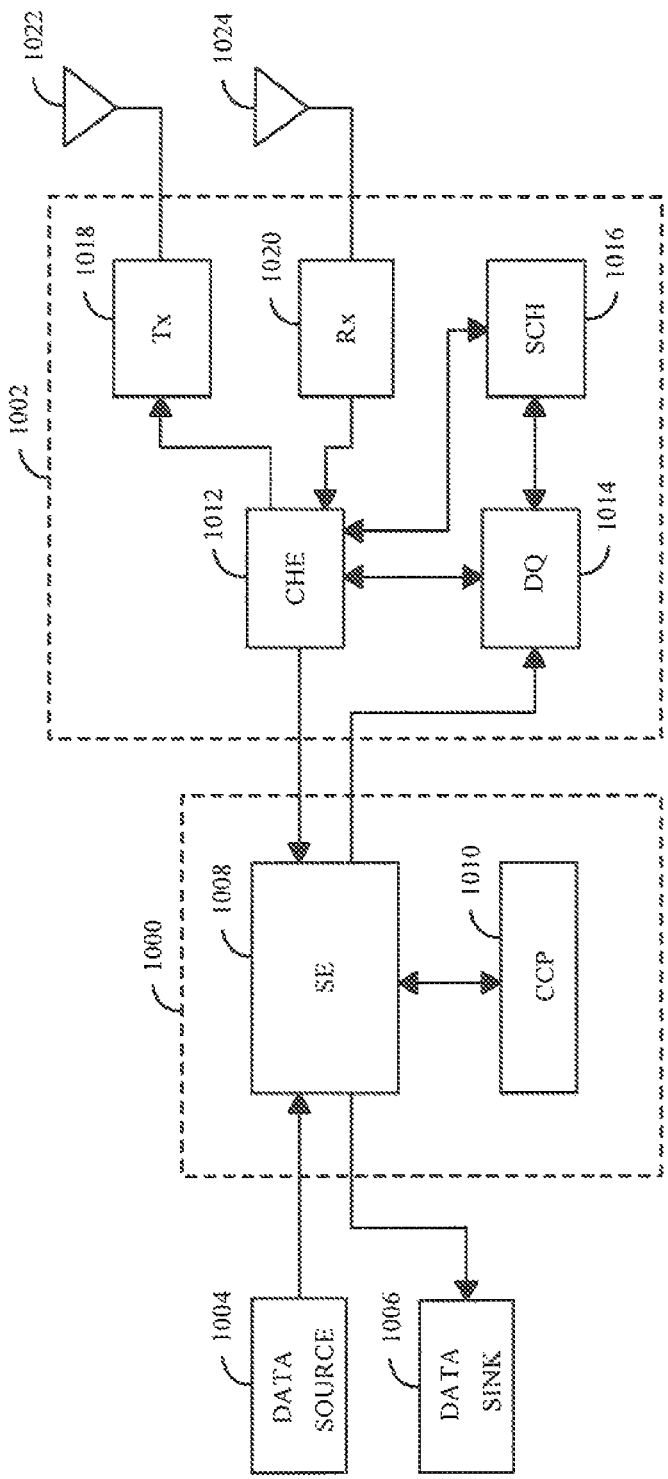
FIG. 10 illustrates access point.

A controller 1000 and an access terminal 1002 is illustrated in FIG. 10. The user data generated by a data source 1004, are provided via an interface unit, e.g., a packet network interface, PSTN, (not shown) to the controller 1000. As discussed, the controller 1000 interfaces with a plurality of access terminals, forming an access network. (Only one assess terminal 1002 is shown in FIG. 10 for simplicity). The user data are provided to a plurality of selector elements (only one selector element 1002 is shown in FIG. 10 for simplicity). One selector element is assigned to control the user data exchange between the data source 1004 and data sink 1006 and one or more base stations under the control of a call control processor 1010. The call control processor 1010 can comprise, e.g., a processor and a storage medium coupled the processor and containing a set of instructions executable the processor. As illustrated in FIG. 10, the selector element 1002 provides the user data to a data queue 1014, which contains the user data to be transmitted to access terminals (not shown) served by the access terminal 1002. In accordance with the control of a scheduler 1016, the user data is provided by the data queue 1014 to a channel element 1012. The channel element 1012 processes the user data in accordance with the IS-856 standard, and provides the processed data to a transmitter 1018. The data is transmitted over the forward link through antenna 1022.

The reverse link signals from access terminals (not shown) are received at the antenna 1024, and provided to a receiver 1016. Receiver 1016 filters, amplifies, demodulates, and digitizes the signal, and provides the digitized signal to the channel element 1016. The channel element 1016 performs the inverse of the signal processing functions done at an access point, and provides decoded data to selector element 1012. Selector element 1012 routes the user data to a data sink 906, and the overhead data to the call control processor 1010.

One skilled in the art will appreciate that although the flowchart diagrams are drawn in sequential order for comprehension, certain steps can be carried out in parallel in an actual implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the embodiments. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for transmitting user data from a set of access terminals, the method comprising:
    receiving at each of a first subset of the set of access terminals a scheduling decision for an interval, wherein at least one time slot of the interval is divided into a first portion and a second portion, the first portion comprising overhead channels;
    selecting at each of the first subset of access terminals a mode for data multiplexing, wherein
        a first mode comprises building user data into the first portion of the time slot using a multiplexing format;
        a second mode comprises building user data into at least one sub-division of the second portion of the time slot, wherein each of the at least one sub-division is associated with the multiplexing format; and
        a third mode comprises building user data into the first portion of the time slot and the second portion of the time slot; and transmitting from at least one of the first subset of access terminals the user data in the interval using the selected mode of data multiplexing in accordance with the scheduling decision.

2. The method of claim 1, wherein said receiving at each of a first subset of the set of access terminals a scheduling decision for an interval includes:
   receiving at each of the first subset of the set of access terminals at least a primary first channel; and
   extracting information from the received primary first channel.

3. The method of claim 2, further comprising extracting information from the received at least one supplemental first channel.

4. The method of claim 1, wherein said building user data into the first portion of the time slot using multiplexing format includes building user data using code division multiplex (CDM).

5. The method of claim 1, wherein the least one sub-division of the second portion of the time slot is determined in accordance with the scheduling decision.

6. The method of claim 5, wherein said building user data into at least one sub-division of the second portion of the time slot includes building user data into the entire second portion of the time slot.

7. The method of claim 5, wherein said building user data into at least one sub-division of the second portion of the time slot includes:
   extracting information from a received at least one supplemental first channel; and
   determining the at least one sub-division in accordance with the extracted information.

8. The method of claim 1, wherein each of the least one sub-division is associated with at least one of code-division multiplex (CDM), time division multiplex (TDM), and orthogonal frequency division multiplex (OFDM).

9. The method of claim 8, wherein said building user data into the at least one sub-division using TDM includes building the user data when a rate of the user data is below a threshold.

10. The method of claim 9, wherein said building user data into the at least one sub-division using OFDM includes building the user data when a rate of the user data is not below a threshold.

11. The method of claim 1, wherein said building user data into the first portion of the time slot and the second portion of the time slot includes building user data originated from a data source into the first portion of the time slot and into the at least one sub-division of the second portion of the time slot.

12. The method of claim 1, wherein said building user data into the first portion of the time slot and the second portion of the time slot includes:
   building user data originated from a first data source into the first portion of the time slot; and
   building user data originated from a second data source into at least one of the at least one sub-division of the second portion of the time slot.

13. The method of claim 1, wherein said transmitting from at least one of the first subset of access terminals user data in the interval using the selected mode of data multiplexing in accordance with the scheduling decision includes:
   extracting information from the received primary first channel; and
   transmitting the user data from access terminals in accordance with the extracted information.

14. The method of claim 1, wherein said transmitting from at least one of the first subset of access terminals user data in the interval using the selected mode of data multiplexing in accordance with the scheduling decision includes transmitting the user data from access terminals that received a permission to transmit.

15. The method of claim 1, wherein said transmitting from at least one of the first subset of access terminals user data in the interval using the selected mode of data multiplexing in accordance with the scheduling decision comprises includes transmitting the user data from access terminals that selected the first mode of data multiplexing and received a denial to transmit.

16. The method of claim 1, further comprising transmitting from a second subset of access terminals user data in the interval using the first mode of data multiplexing, wherein the second subset is mutually exclusive from the first subset.

17. The method of claim 1, further comprising transmitting the user data from a third subset of the set of access terminals, the third subset mutually exclusive from the first subset and the second subset.

18. An apparatus for transmitting user data from a set of access terminals, the apparatus comprising:
   a first set of access terminal, each of the first set of access terminals comprising:
   a receiver;
   a transmitter;
   a storage media configured to store instructions; and
   at least one processor coupled to the receiver and the storage media, capable of processing a set of the instructions to:
   obtain from a signal provided by the receiver a scheduling decision for an interval, wherein at least one time slot of the interval is divided into a first portion and a second portion, the first portion comprising overhead channels;
   select a mode for data multiplexing, wherein
      a first mode comprises building user data into the first portion of the time slot using a multiplexing format;
      a second mode comprises building user data into at least one sub-division of the second portion of the time slot, wherein each of the at least one sub-division is associated with the multiplexing format; and
      a third mode comprises building user data into the first portion of the time slot and the second portion of the time slot and
   cause the transmitter to transmit user data in the interval using the selected mode of data multiplexing in accordance with the scheduling decision.

19. The apparatus of claim 18, wherein said receiver is configured to:
   receive at least a primary first channel;
   extract information from the received primary first channel; and
   provide the extracted information to the at least one processor.

20. The apparatus of claim 19, wherein said receiver is configured to extract information from the received at least one supplemental first channel.

21. The apparatus of claim 18, wherein the building user data into the first portion of the time slot includes the use of code division multiplex (CDM).

22. The apparatus of claim 18, wherein the building user data into at least one sub-division of the second portion of the interval time slot includes:
   determining the at least one sub-division in accordance with the scheduling decision; and
   building the user data into the determined at least one sub-division.

23. The apparatus of claim 22 wherein the building user data into the determined at least one sub-division includes processing a set of instructions for building the user data into the entire second portion of the time slot.

24. The apparatus of claim 22, wherein the at least one processor determines the at least one sub-division in accordance with the scheduling decision by processing instructions to:
process the extracted information from the at least one supplemental first channel; and
determine the at least one sub-division in accordance with the extracted information.

25. The apparatus of claim 18, wherein the at least one processor causes building user data into at least one sub-division of the second portion of the time slot by processing a set of instructions to:
associate each of the at least one sub-division of the second portion of the time slot with one of code-division multiplex (CDM), time division multiplex (TDM), and orthogonal frequency division multiplex (OFDM); and
build data into each of the at least one sub-division using the associated multiplex format.

26. The apparatus of claim 25, wherein the at least one processor causes building user data into the at least one sub-division using TDM by processing a set of instructions to build user data when a rate of user data is below a threshold.

27. The apparatus of claim 25, wherein the at least one processor causes building user data into the at least one sub-division using OFDM by processing a set of instructions to build user data when a rate of user data is not below a threshold.

28. The apparatus of claim 25 wherein the at least one processor causes the transmitter to transmit user data in the interval using the selected mode of data multiplexing in accordance with the scheduling decision by processing a set of instructions to transmit the user data when the first mode of data multiplexing was selected and the scheduling decision is a denial to transmit.

29. The apparatus of claim 18, wherein the at least one processor causes building user data into the first portion of the time slot and the second portion of the time slot by processing a set of instructions to build user data originated from a data source into the first portion of the interval and into the at least one sub-division of the second portion of the interval.

30. The apparatus of claim 18, wherein the at least one processor causes building user data into the first portion of the time slot and the second portion of the time slot by processing a set of instructions to:
cause building user data originated from a first data source into the first portion of the interval; and
cause building user data originated from a second data source into at least one of the at least one sub-division of the second portion of the interval.

31. The apparatus of claim 18, wherein the at least one processor causes the transmitter to transmit user data in the interval using the selected mode of data multiplexing in accordance with the scheduling decision by processing a set of instructions to:
process the extracted information from the received primary first channel; and
cause the transmitter to transmit the user data in accordance with the extracted information.

32. The apparatus of claim 18, wherein the at least one processor causes the transmitter to transmit user data in the interval using the selected mode of data multiplexing in accordance with the scheduling decision by processing a set of instructions to transmit the user data when the scheduling decision is a permission to transmit.

33. The apparatus of claim 18 wherein the at least one processor is further configured to process a set of instructions to:
ignore processing of the signal provided by the receiver to obtain a scheduling decision for an interval; and
cause the transmitter to transmit user data in the interval using the first mode of data multiplexing.

34. The apparatus of claim 18, further comprising:
a second set of access terminals, each of the second set of access terminals comprising:
a receiver;
a transmitter;
a storage media configured to store instructions; and
at least one processor coupled to the receiver and the storage media, for processing a set of the instructions to transmit the user data.

35. The apparatus of claim 34 wherein the user data are transmitted using code-division multiple access.

36. The apparatus of claim 35 wherein the user data are transmitted using a code-division multiple-access in accordance with IS-856 standard.

37. An apparatus for transmitting user data, the apparatus comprising:
means for receiving a scheduling decision for an interval, wherein at least one time slot of the interval is divided into a first portion and a second portion, the first portion comprising overhead channels;
means for selecting a mode for data multiplexing, wherein
a first mode comprises building user data into the first portion of the time slot using a multiplexing format;
a second mode comprises building user data into at least one sub-division of the second portion of the time slot, wherein each of the at least one sub-division is associated with the multiplexing format; and
a third mode comprises building user data into the first portion of the time slot and the second portion of the time slot; and
means for transmitting the user data in the interval using the selected mode of data multiplexing in accordance with the scheduling decision.

38. A computer-program product for transmitting user data, the computer-program product comprising a computer-readable medium having instructions thereon, the instructions comprising:
code for receiving a scheduling decision for an interval, wherein at least one time slot of the interval is divided into a first portion and a second portion, the first portion comprising overhead channels;
code for selecting a mode for data multiplexing, wherein
a first mode comprises building user data into the first portion of the time slot using a multiplexing format;
a second mode comprises building user data into at least one sub-division of the second portion of the time slot, wherein each of the at least one sub-division is associated with the multiplexing format; and
a third mode comprises building user data into the first portion of the time slot and the second portion of the time slot; and
code for transmitting the user data in the interval using the selected mode of data multiplexing in accordance with the scheduling decision.

* * * * *